US011367187B2

(12) United States Patent
Krauth et al.

(10) Patent No.: US 11,367,187 B2
(45) Date of Patent: Jun. 21, 2022

(54) METHOD FOR DETECTING THE PRESENCE OF DIFFERENT ANTINUCLEAR ANTIBODY FLUORESCENCE PATTERN TYPES AND APPARATUS FOR THIS PURPOSE

(71) Applicant: EUROIMMUN Medizinische Labordiagnostika AG, Luebeck (DE)

(72) Inventors: Jens Krauth, Luebeck (DE); Christopher Krause, Buechen (DE); Joern Voigt, Luebeck (DE); Melanie Hahn, Stockelsdorf (DE); Christian Marzahl, Erlangen (DE); Stefan Gerlach, Gross Groenau (DE)

(73) Assignee: EUROIMMUN Medizinische Labordiagnostika AG, Luebeck (DE)

( * ) Notice: Subject to any disclaimer, the term of this patent is extended or adjusted under 35 U.S.C. 154(b) by 61 days.

(21) Appl. No.: 16/946,733

(22) Filed: Jul. 2, 2020

(65) Prior Publication Data
US 2021/0019883 A1 Jan. 21, 2021

(30) Foreign Application Priority Data
Jul. 19, 2019 (EP) .................................. 19187348

(51) Int. Cl.
*G06K 9/00* (2022.01)
*G06T 7/00* (2017.01)
(Continued)

(52) U.S. Cl.
CPC ....... *G06T 7/0012* (2013.01); *G01N 15/1056* (2013.01); *G06N 3/04* (2013.01);
(Continued)

(58) Field of Classification Search
CPC .................................................. G01N 21/6428
See application file for complete search history.

(56) References Cited

U.S. PATENT DOCUMENTS 8,637,327 B2   1/2014 Winfried et al.
9,536,304 B2 * 1/2017 Mangan ................ G06T 7/0012
(Continued)

FOREIGN PATENT DOCUMENTS

DE   10 2006 027 516       12/2007
EP        1 921 552 A1      5/2008
WO       2008/058935        5/2008

OTHER PUBLICATIONS

Xu, Jun et al. "A Deep Convolutional Neural Network for segmenting and classifying epithelial and stromal regions in histopathological images." Neurocomputing 191 (2016): 214-223. (Year: 2016).*
(Continued)

*Primary Examiner* — Hadi Akhavannik
(74) *Attorney, Agent, or Firm* — Grüneberg and Myers PLLC

(57) ABSTRACT

A method is for detecting respective potential presence of respective different antinuclear antibody fluorescence pattern types on a biological cell substrate including human epithelioma cells, including: acquiring a first image which represents staining of the cell substrate by a first fluorescent dye, and acquiring a second image which represents staining of the cell substrate by a second fluorescent dye, detecting, on the basis of the first image, respective image segments which in each case represent at least one mitotic cell, selecting, on the basis of the detected image segments, subimages of the first image and subimages corresponding thereto of the second image and detecting, on the basis of the selected subimages of the first image and of the selected subimages of the second image, respective actual presence of respective cellular fluorescence pattern types by means of a convolutional neural network.

15 Claims, 29 Drawing Sheets

(51) Int. Cl.
G06T 7/11 (2017.01)
G06T 7/70 (2017.01)
G01N 15/10 (2006.01)
G06N 3/04 (2006.01)

(52) U.S. Cl.
CPC .................. *G06T 7/11* (2017.01); *G06T 7/70* (2017.01); *G01N 2015/1006* (2013.01); *G06T 2207/10064* (2013.01); *G06T 2207/20084* (2013.01); *G06T 2207/30024* (2013.01)

(56) References Cited

U.S. PATENT DOCUMENTS

| | | | | |
|---|---|---|---|---|
| 2008/0199078 | A1* | 8/2008 | Lam | G06T 7/337 382/190 |
| 2012/0083519 | A1* | 4/2012 | Sahali | C12Q 1/6883 514/44 A |
| 2013/0044933 | A1* | 2/2013 | Kenny | G01N 21/6458 382/133 |
| 2015/0032671 | A9* | 1/2015 | Kamath | G06K 9/00127 706/12 |
| 2017/0152552 | A1* | 6/2017 | Takahashi | C12Q 1/6841 |
| 2020/0011862 | A1 | 1/2020 | Morgenroth et al. | |
| 2020/0300764 | A1* | 9/2020 | Gerlach | G01N 21/6458 |
| 2021/0164883 | A1* | 6/2021 | Imakubo | G06K 9/00127 |
| 2021/0164886 | A1* | 6/2021 | Shirai | G01N 21/6428 |

OTHER PUBLICATIONS

Extended European Search Report dated Jan. 27, 2020 in European Application No. 19187348.8 with English translation, 13 pages.

Lin, et al., "SAT0646 Development and Validation of a Deep Learning Algorithm for Classifying Anti-Nuclear Antibody Patterns in Indirect Immunofluorescence Images," Scientific Abstracts, Saturday, Jun. 16, 2018, 1773.

Rodrigues, et al., "Exploiting Convolutional Neural Networks and preprocessing techniques for HEp-2 cell classification in immunofluorescence images," IEEE Computer Society, 2017 30th SIBGRAPI Conference on Graphics, Patterns and Images, pp. 170-177.

U.S. Appl. No. 16/502,630, filed Jul. 3, 2019, 2020/0011862, Morgenroth et al.

"Call for Abstracts", 14th Dresden Symposium on Autoantibodies, Sep. 10-13, 2019, 2 pages.

Cascio et al., "Deep Convolutional Neural Network for Hep-2 Fluorescence Intensity Classification", Applied Sciences, vol. 9, No. 408, 2019, pp. 1-9.

Divya et al., "Hep-2 cell classification using artificial neural networkapproach", 23rd International Conference on Pattern Recognition (ICPR), Cancun—Mexico, Dec. 4-8, 2016, pp. 84-89.

Egerer et al., "Automated evaluation of autoantibodies on human epithelial-2 cells as an approach to standardize cell-based immunofluorescence tests", Arthritis Research & Therapy, vol. 12, No. R40, 2010, pp. 1-9.

European Third-party observations dated Nov. 5, 2021 in the European Application 19187348.8, 25 pages.

Gao et al., "Hep-2 Cell Image Classification with Deep Convolutional Neural Networks", Faculty of Engineering and Information Sciences—Papers: Part B, 2017, 34 pages.

Gupta et al., "CNN based Mitotic Hep-2 Cell Image Dtetection", 5th International Conference on Bioimaging, 2018, pp. 167-174.

Hiemann et al., "Die HEP-2-Zelle als Target für multiparametrishe Autoantikörperanalytik—Automatisierung und Standardisierung[1]" ["The Hep-2 cell as target for multiparametric autoantibody analyses: automation and standardization"], J. Lab. Med., vol. 35, No. 6, 2011, with English abstract, pp. 351-361.

Hiemann et al, "Artificial intelligence for automated pattern recognition", Precision Medicine—Role of Autoantibodies in the Prediction and Care of Autoimmune Diseases, Report on the 14th Dresdren Symposium on Autoantibodies, Sep. 10-13, 2019, pp. 415-416.

Oraibi et al., "Learning local and deep features for efficient cell image classification using random forests", ICIP, 2018, pp. 2446-2450.

Strandmark et al., "Hep-2 Staining Pattern Classification", Pattern Recognition (ICPR), 21st International Conference on IEEE—Institute of Electrical and Electronics Engineers Inc., 2012, 5 pages.

Wan et al., "Confnet: Predict with Confidence", ICASSP, 2018, pp. 2921-2925.

Xi et al., "Deep Convolutional Neural Network Based Hep-2 Cell Classification", 23rd International Conference on Pattern Recognition (ICPR), Cancun—Mexico, Dec. 4-8, 2016, IEEE, pp. 70-80.

Communication from the Examination Division dated Feb. 14, 2022 in European Application No. 19187348.8, 13 pages.

Infantino et al., "The burden of the variability introduced by the Hep-2 assay kit and the CAD system in ANA indirect immunofluorescence test", Mechanism in Autoimmunity, vol. 65, 2017, pp. 345-354.

* cited by examiner

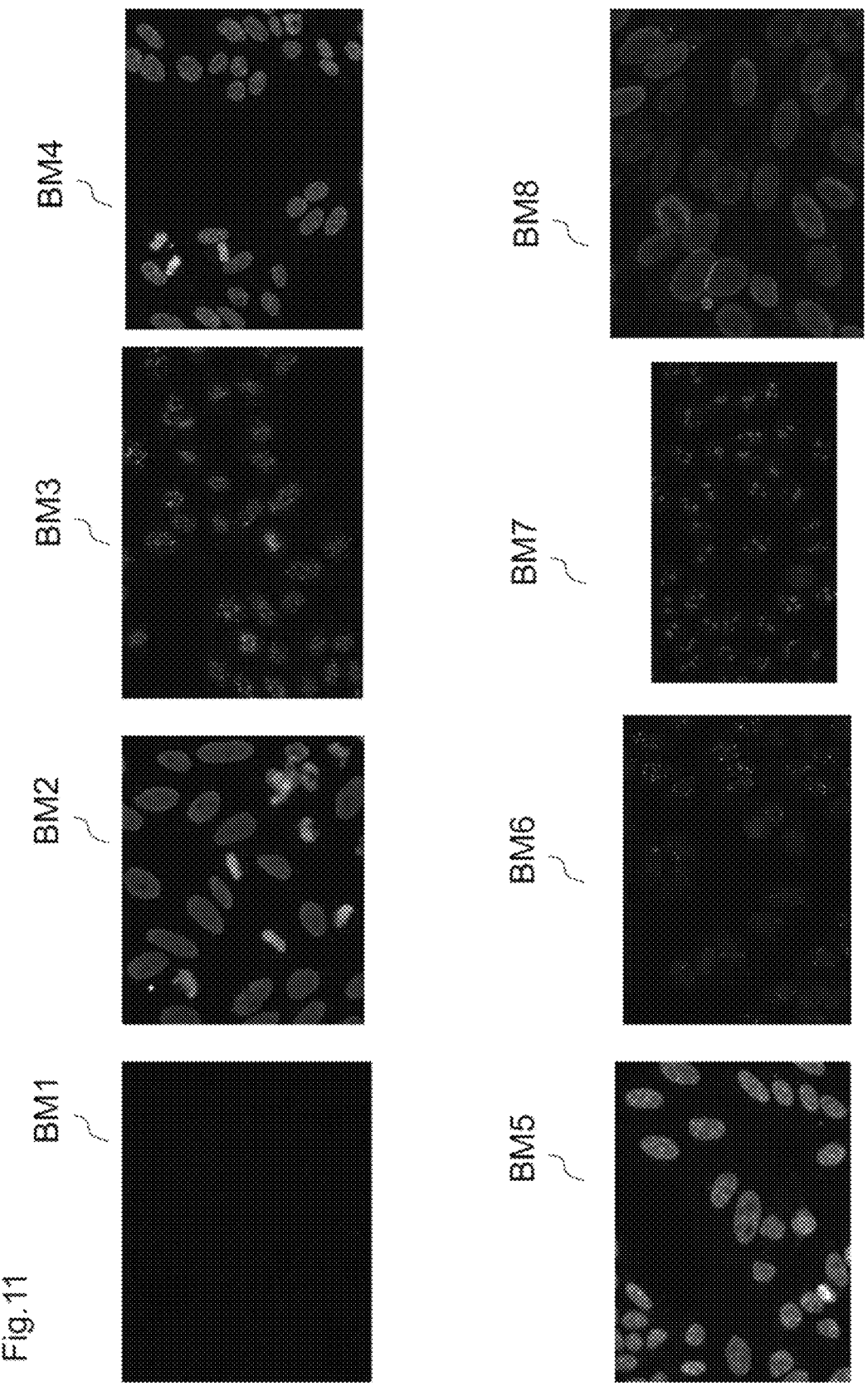

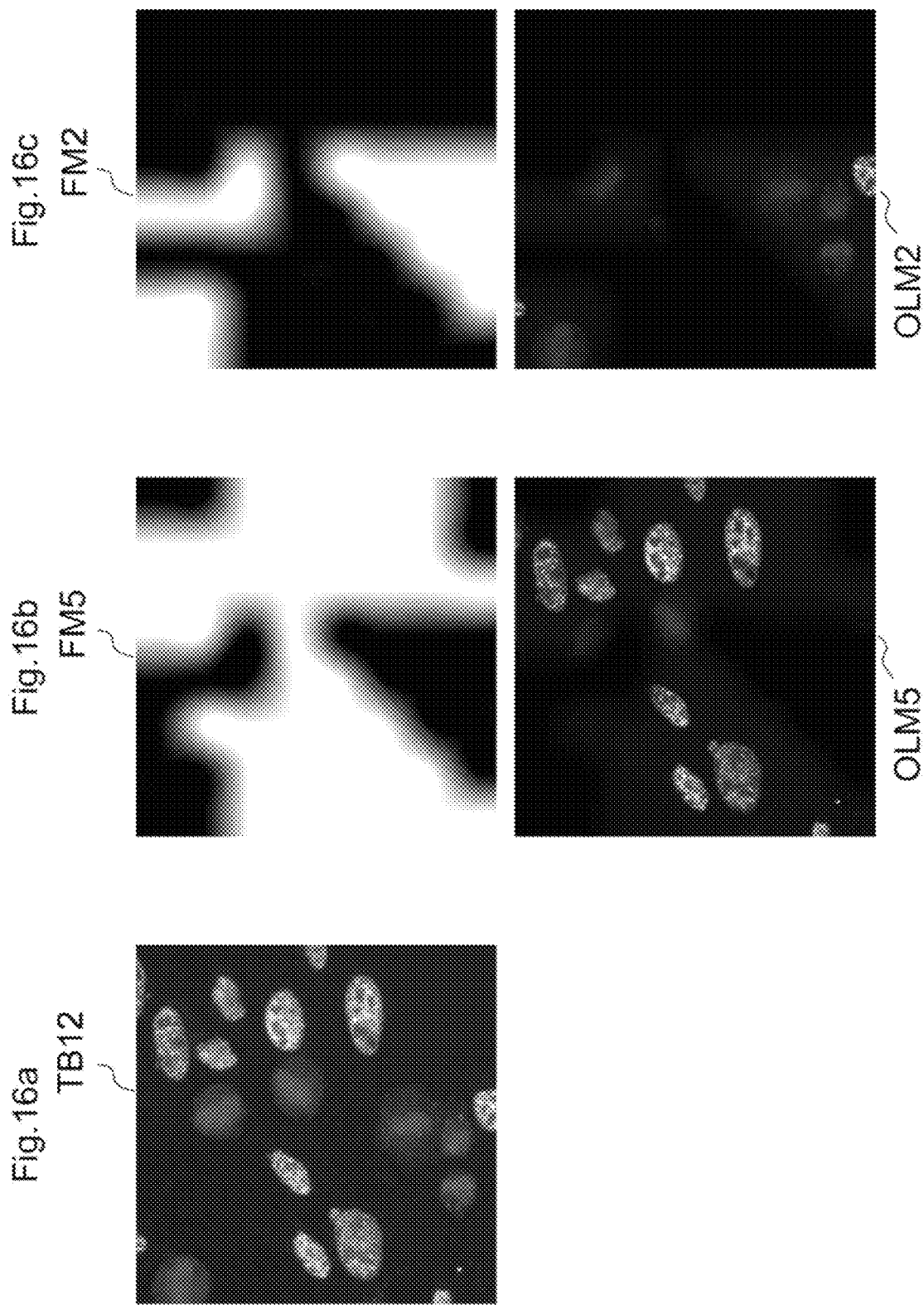

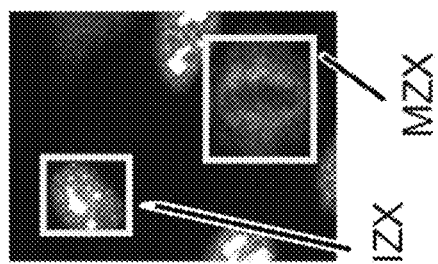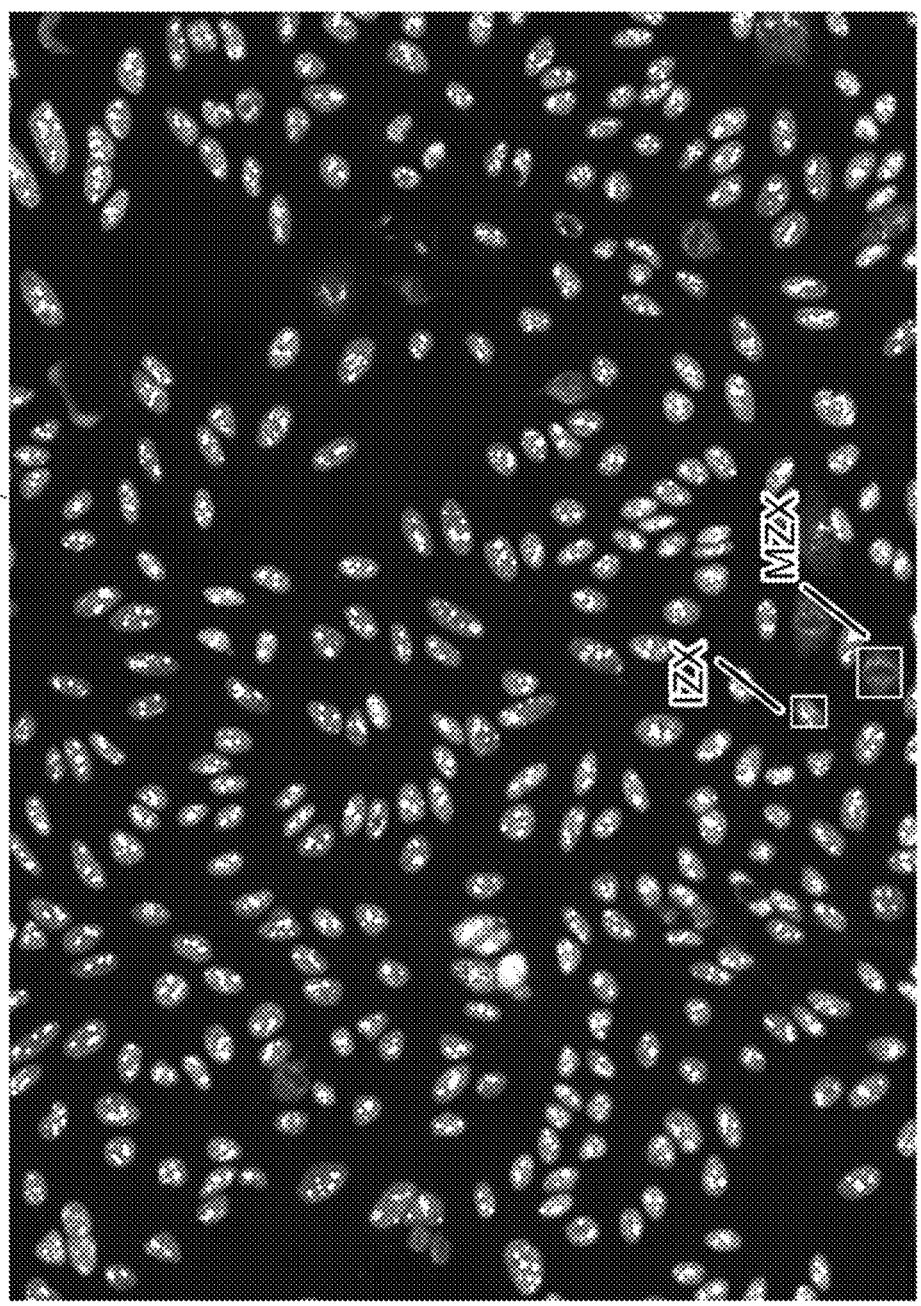

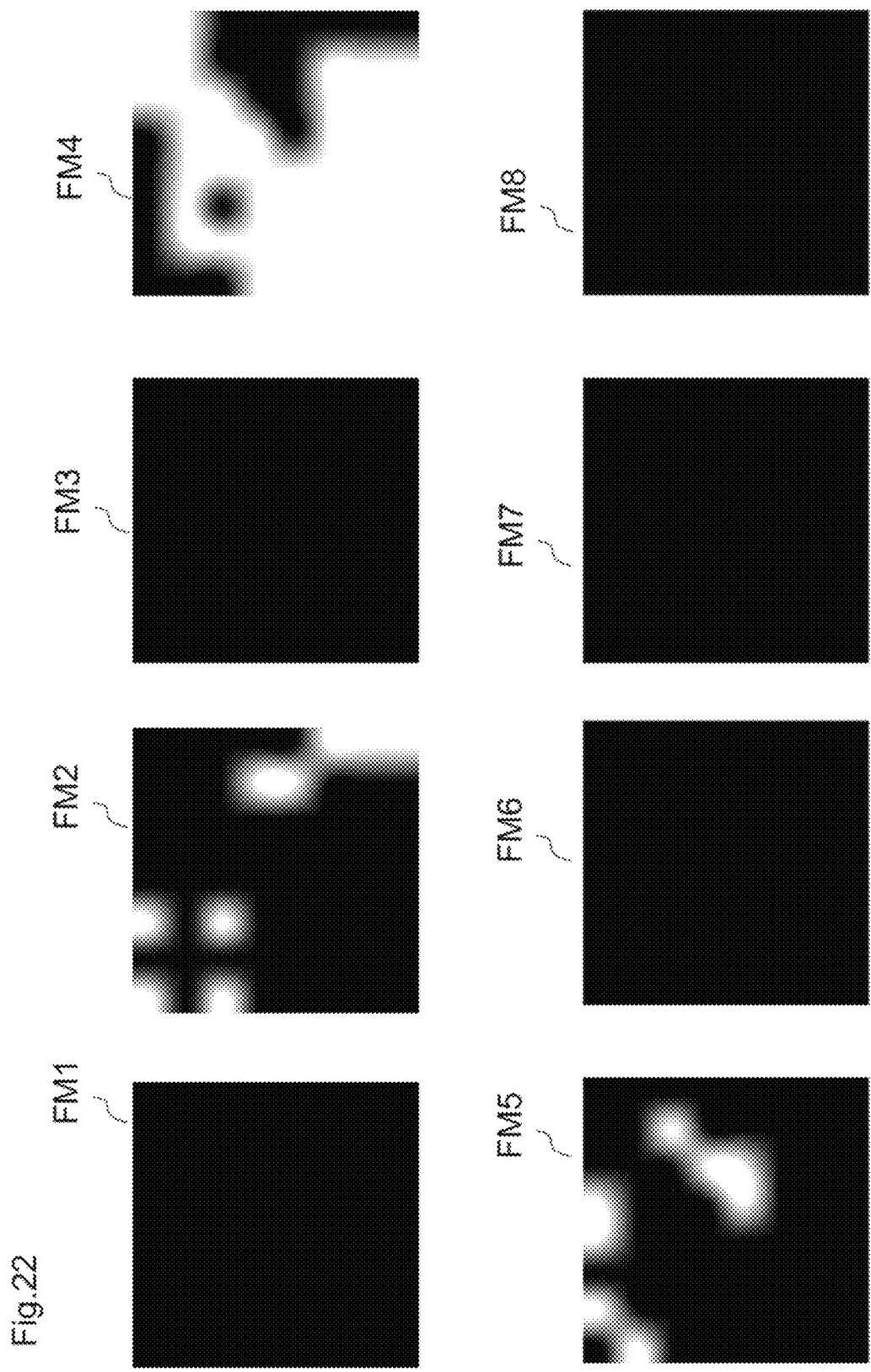

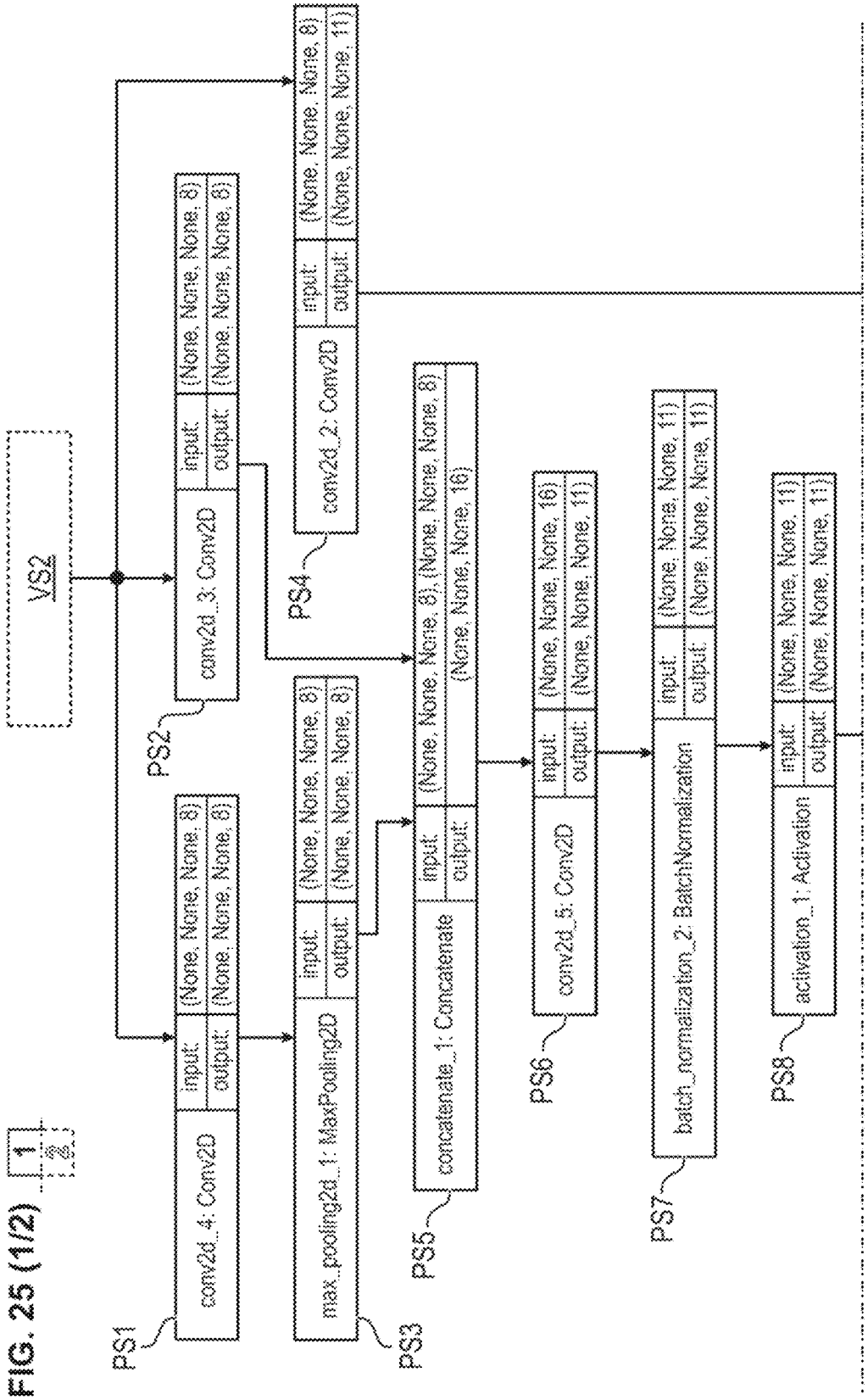
FIG. 25 (1/2)

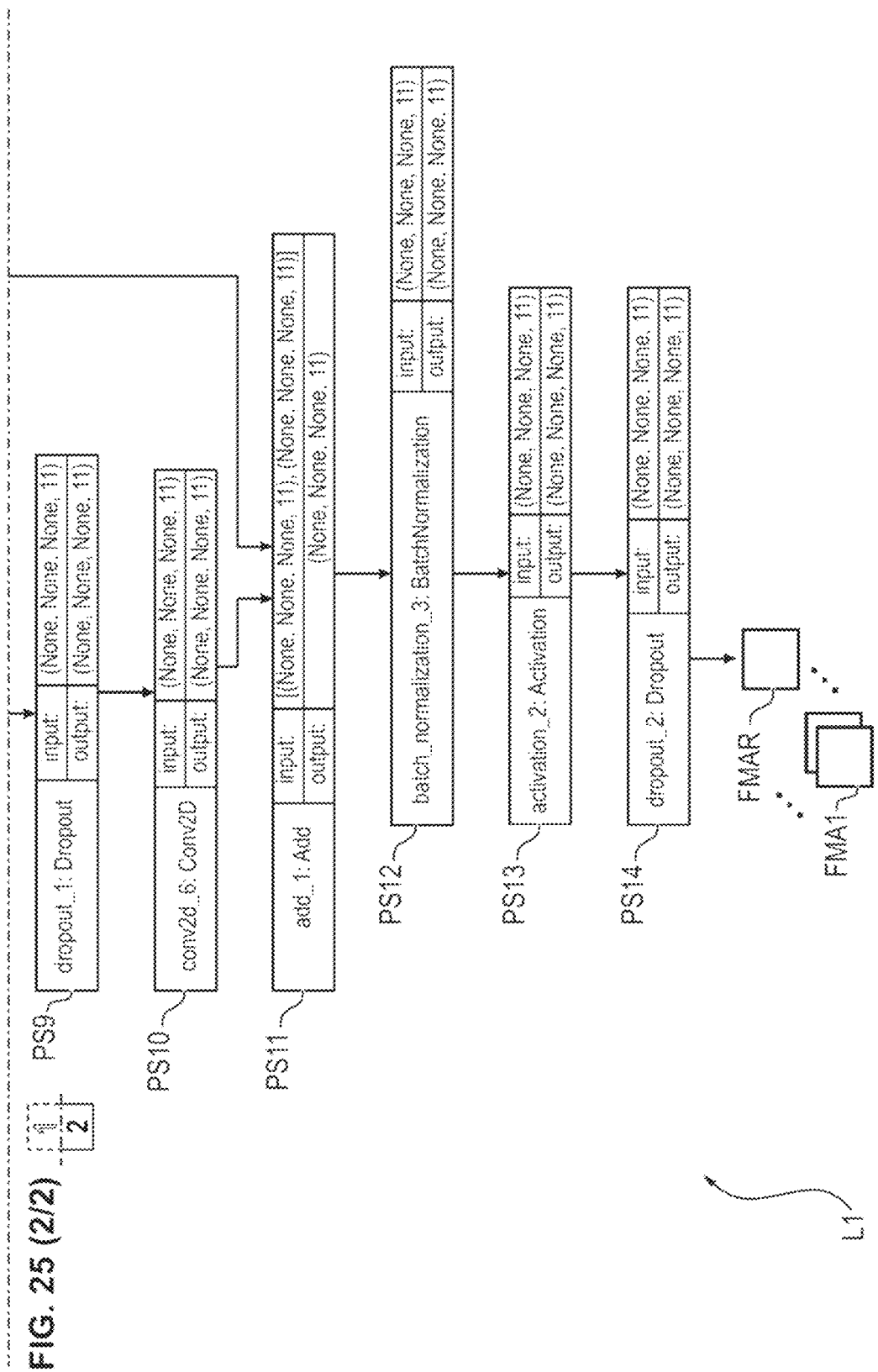
FIG. 25 (2/2)

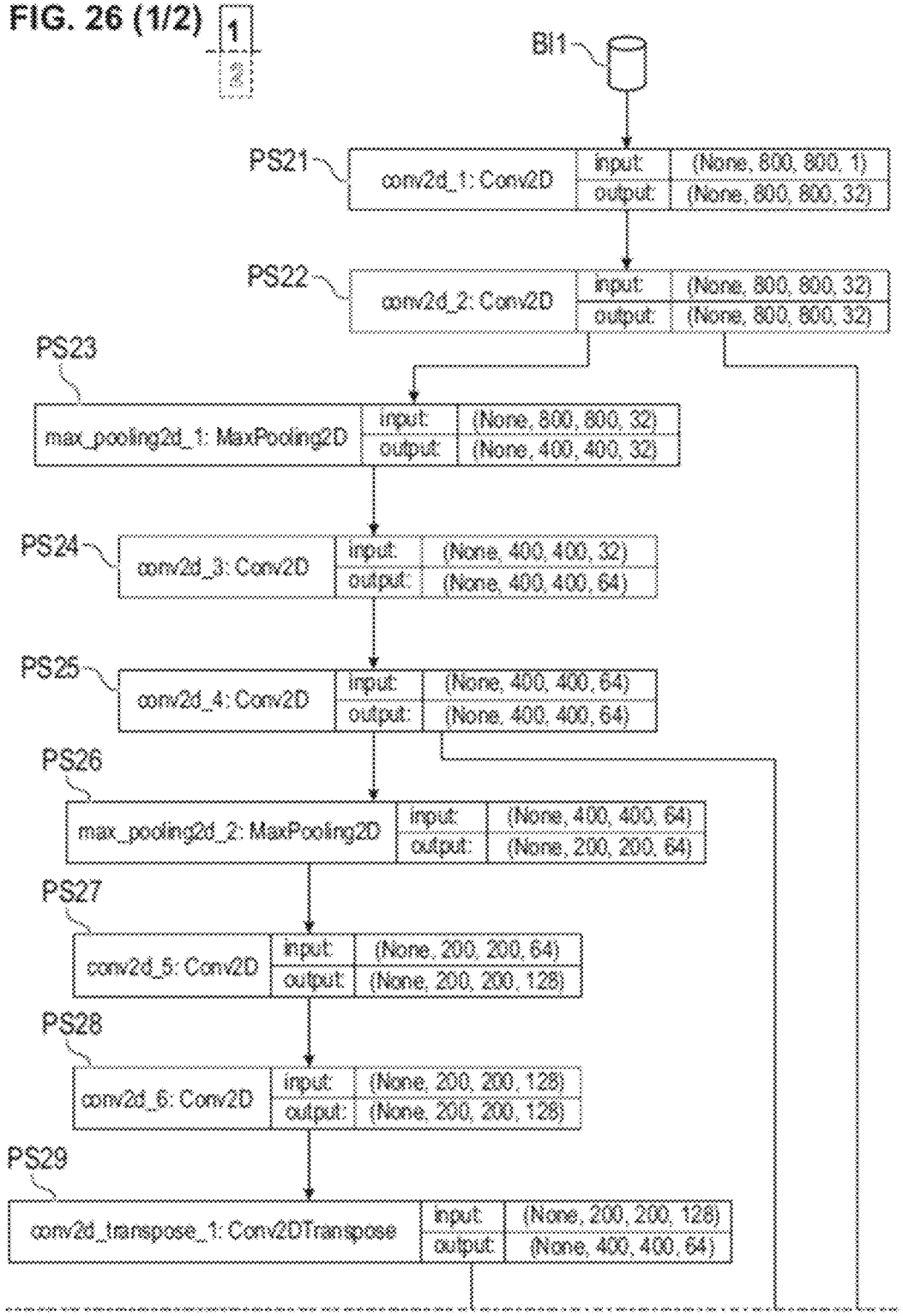

FIG. 26 (2/2)
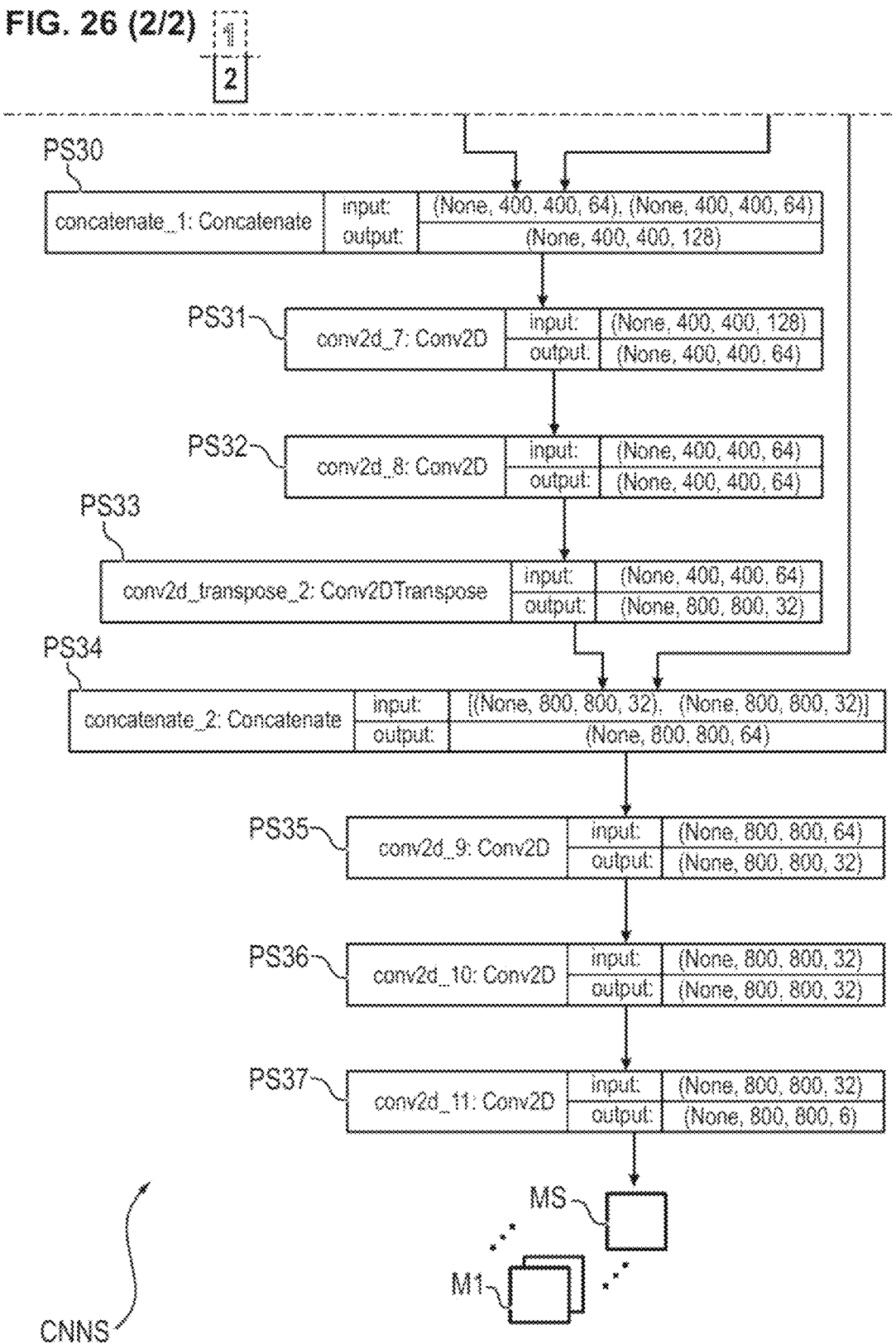

Fig. 27

| | TA | FA | TR | FR | Sens | FAR | Spec | FRR |
|---|---|---|---|---|---|---|---|---|
| Dense fine speckled (AC-2), n=4 | 21 | 1 | 139 | 0 | 1 | 0.0071 | 0.9929 | 0.0000 |
| Discrete nuclear dots (AC-6, 7), n=6 | 9 | 2 | 148 | 2 | 0.8182 | 0.0133 | 0.9867 | 0.1818 |
| Fine or large/coarse speckled (AC-4, AC-5), n=5 | 11 | 10 | 138 | 2 | 0.8462 | 0.0676 | 0.9324 | 0.1538 |
| Homogeneous (AC-1), n=2 | 14 | 5 | 141 | 1 | 0.9333 | 0.0342 | 0.9658 | 0.0667 |
| Nuclear envelope (AC-11, 12), n=8 | 12 | 4 | 144 | 1 | 0.9231 | 0.0270 | 0.9730 | 0.0769 |
| Negative (AC-0), n=1 | 73 | 0 | 82 | 6 | 0.9241 | 0.0000 | 1 | 0.0759 |
| Nucleolar (AC-8, 9, 10), n=7 | 11 | 7 | 143 | 0 | 1 | 0.0467 | 0.9533 | 0.0000 |
| Centromere (AC-3), n=3 | 10 | 1 | 150 | 0 | 1 | 0.0066 | 0.9934 | 0.0000 |

Table 1

METHOD FOR DETECTING THE PRESENCE OF DIFFERENT ANTINUCLEAR ANTIBODY FLUORESCENCE PATTERN TYPES AND APPARATUS FOR THIS PURPOSE

CROSS-REFERENCE TO RELATED APPLICATION

The present application claims the benefit to European application EP 19 187 348.8, filed on 10 Jul. 19, 2019, the content of which is hereby incorporated by reference in its entirety.

BACKGROUND OF THE INVENTION

Field of the Invention

The invention relates to a method and an apparatus for detecting respective potential presence of respective different cellular fluorescence pattern types on a biological cell substrate comprising human epithelioma cells (HEp cells), wherein the fluorescence pattern types comprise different antinuclear antibody fluorescence pattern types. The invention further relates to a method for detecting potential presence of different cellular fluorescence pattern types on a biological cell substrate comprising human epithelioma cells by means of digital image processing and to a computing unit, a data network apparatus, a computer program product as well as a data carrier signal for this purpose.

Discussion of the Background

It is a known method for the purposes of medical diagnostics and in particular for the purposes of detecting autoantibodies in a liquid patient sample such as for example blood or blood serum to incubate a biological substrate which comprises human epithelioma cells with the liquid patient sample or indeed the diluted liquid patient sample. Depending on the presence of specific primary autoantibodies in the patient sample, these primary antibodies bind to different regions of the stated cells. The biological cell substrate is then further incubated with secondary antibodies which are labelled with what is known as a fluorescent dye. Such secondary antibodies may in turn bind to the primary antibodies which are bound on the cell substrate. After irradiating the substrate with excitation radiation, the stated fluorescent dye then fluoresces, such that in a corresponding fluorescence image the primary antibodies of the patient sample which are bound to the cells of the cell substrate and to which in turn are bound secondary antibodies with the fluorescent dye can then be located as a fluorescence pattern in a fluorescence image. Depending on the patient's disease or the presence of specific primary antibodies in the patient sample, different specific fluorescence patterns are obtained. Where primary antibodies are detected as "autoantibodies", which are directed against the cell nuclei or the antigens of the cell nucleus, what is known as antinuclear antibody fluorescence patterns are obtained. These are also known as ANA fluorescence patterns or ANA patterns.

Such autoantigens have been named either on the basis of biochemical features (DNA, histones, ribonucleoproteins (RNP)) or on the basis of diseases associated with the autoantibodies.

In the course of indirect immunofluorescence (IIFT) using human epithelial cells or human epithelioma cells, the object thus arises of identifying and classifying the various resultant fluorescence pattern types. One individual pattern alone need not per se necessarily be present in a fluorescence image, but a plurality of patterns may also be simultaneously present.

Antibodies against nuclear antigens are directed against various components of the cell nucleus (biochemical substances of the cell nucleus). These include nucleic acids, cell nucleus proteins and ribonucleoproteins.

The various antinuclear antibody fluorescence pattern types obtained are differentiated into various pattern types. One approach to this may be found on the web page www.anapatterns.org which inter alia lists and differentiates various nuclear patterns. FIG. 24 shows an exemplary classification in accordance with this scheme.

SUMMARY OF THE INVENTION

An object of the present invention is, by means of digital image processing, to provide a method which automatically detects respective potential presence of respective different antinuclear antibody fluorescence pattern types in a fluorescence image.

The present application includes the following embodiments:

1. Method for detecting respective potential presence of respective different cellular fluorescence pattern types on a biological cell substrate (SU) comprising human epithelioma cells,
   wherein the cellular fluorescence pattern types comprise a plurality of different antinuclear antibody fluorescence pattern types,
   the method comprising
   incubating the cell substrate (SU) with a liquid patient sample which potentially comprises primary antibodies, further with a first fluorescent dye and further with secondary antibodies which are labelled with a second fluorescent dye,
   acquiring a first image (B1) which represents staining of the cell substrate by the first fluorescent dye and acquiring a second image (B2) which represents staining of the cell substrate by the second fluorescent dye,
   characterized by
   detecting, on the basis of the first image (B1), respective image segments (VMZ) which in each case represent at least one mitotic cell (MZX, MZY),
   selecting, on the basis of the detected image segments (VMZ), subimages (TB11) of the first image (B1) and subimages (TB12) corresponding thereto of the second image (B2) and
   detecting, on the basis of the selected subimages (TB11) of the first image (B1) and of the selected subimages (TB12) of the second image (B2), respective actual presence of respective cellular fluorescence pattern types by means of a convolutional neural network (CNN2).

2. Method according to embodiment 1,
   further comprising
   detecting, on the basis of the first image (B1), respective image segments (VMZ) which in each case represent at least one mitotic cell (MZX, MZY) of a sufficient quality,
   selecting subimages (TB11) of the first image (B1) and subimages (TB12) corresponding thereto of the second image (B2) on the basis of the detected image segments (VMZ) which in each case represent at least one mitotic cell (MZX, MZY) of a sufficient quality. 3. Method according to embodiment 1,
    further comprising
    determining, on the basis of the selected subimages (TB11) of the first image (B1) and of the selected subimages (TB12) of the second image, respective confidence measures (PI, PI*) for the respective actual presence of the respective fluorescence pattern types by means of the convolutional neural network (CNN2).
4. Method according to embodiment 3,
    wherein the convolutional neural network (CNN2) comprises an output layer (LP, AVS) which generates a respective feature map (FM1-FMN) for a respective cellular fluorescence pattern type,
    and wherein the convolutional neural network (CNN2) determines a respective confidence measure (P1-PN) on the basis of a respective feature map (FM1-FMN).
5. Method according to embodiment 3,
    further comprising
    segmenting the first image (B1) into image segments of different segment classes,
    determining at least one lightness value (HI) for at least one fluorescence pattern type on the basis of one or more image segments of at least one specific segment class and
    verifying the confidence measure (PI, PI*) of the at least one fluorescence pattern type on the basis of the lightness value (HI) of the at least one fluorescence pattern type.
6. Method according to embodiment 5,
    wherein the confidence measure (PI, PI*) is verified on the basis of the lightness value (HI) and as a function of a user-predeterminable threshold value (H1-HN).
7. Method according to embodiment 3,
    further comprising,
    for a respective subimage tuple which comprises a subimage (TB11) of the first image (B1) and a corresponding subimage (TB12) of the second image (B2), determining respective subimage confidence measures (PI1-PI3) for respective actual subimage presence of respective cellular fluorescence pattern types by means of the convolutional neural network (CNN2) and determining the respective confidence measures for the respective actual presence of the respective fluorescence pattern types on the basis of the subimage confidence measures.
8. Method according to embodiment 1,
    further comprising
    dividing the second image (B2) into a set of subimages in accordance with a predetermined division scheme,
    selecting subimages (TB12) of the second image (B2) on the basis of the detected image segments and selecting subimages corresponding thereto (TB11) of the first image (B1)
    and detecting respective actual presence of respective cellular fluorescence pattern types by means of the convolutional neural network (CNN2) on the basis of the selected subimages (TB12) of the second image (B2) and on the basis of the selected subimages (TB11) of the first image (B1).
9. Apparatus (V1) for detecting respective potential presence of respective different cellular fluorescence pattern types on a biological cell substrate comprising human epithelioma cells by means of digital image processing, comprising
    a holder (HL) for the biological substrate (SU) which has been incubated with a liquid patient sample which potentially comprises primary antibodies, further with a first fluorescent dye and further with secondary antibodies which are labelled with a second fluorescent dye,
    further at least one image acquisition unit (K1, K2) for acquiring a first image (B1) which represents staining of the cell substrate by the first fluorescent dye and for acquiring a second image (B2) which represents staining of the cell substrate by the second fluorescent dye,
    characterized by at least one computing unit (R) which is configured
    to detect, on the basis of the first image (B1), respective image segments (VMZ) which in each case represent at least one mitotic cell (MZX, MZY),
    to select, on the basis of the detected image segments, subimages (TB11) of the first image (B1) and subimages (TB12) corresponding thereto of the second image (B2) and
    to detect, on the basis of the selected subimages (TB11) of the first image (B1) and of the selected subimages (TB12) of the second image (B2), respective actual presence of respective cellular fluorescence pattern types by means of a convolutional neural network (CNN2).
10. Method for detecting respective potential presence of respective different cellular fluorescence pattern types on a biological cell substrate comprising human epithelioma cells by means of digital image processing, comprising
    acquiring a first image (B1) which represents staining of a biological cell substrate by a first fluorescent dye,
    acquiring a second image (B2) which represents staining of the biological cell substrate by a second fluorescent dye,
    characterized by
    detecting, on the basis of the first image (B1), respective image segments (VMZ) which in each case represent at least one mitotic cell (MZX, MZY),
    selecting, on the basis of the detected image segments (VMZ), subimages (TB11) of the first image (B1) and subimages (TB12) corresponding thereto of the second image (B2) and
    detecting, on the basis of the selected subimages (TB11) of the first image (B1) and of the selected subimages (TB12) of the second image (B2), respective actual presence of respective cellular fluorescence pattern types by means of a convolutional neural network (CNN2).
11. Method for digital image processing,
    comprising
    receiving a first image (B1) which represents staining of a biological cell substrate by a first fluorescent dye, wherein the biological cell substrate comprises human epithelioma cells,
    receiving a second image (B2) which represents staining of the biological cell substrate by a second fluorescent dye, characterized by
- detecting, on the basis of the first image (B1), respective image segments (VMZ) which in each case represent at least one mitotic cell (MZX, MZY),
- selecting, on the basis of the detected image segments (VMZ), subimages (TB11) of the first image (B1) and subimages (TB12) corresponding thereto of the second image (B2) and
- detecting, on the basis of the selected subimages (TB11) of the first image (B1) and of the selected subimages (TB12) of the second image (B2), respective actual presence of respective cellular fluorescence pattern types by means of a convolutional neural network (CNN2).

12. Computing unit (R) which, in the course of digital image processing, is configured
- to receive a first image (B1) which represents staining of a biological cell substrate by a first fluorescent dye, wherein the biological cell substrate comprises human epithelioma cells,
- to receive a second image (B2) which represents staining of the biological cell substrate by a second fluorescent dye, characterized in that the computing unit is further configured
- to detect, on the basis of the first image (B1), respective image segments (VMZ) which in each case represent at least one mitotic cell,
- to select, on the basis of the detected image segments (VMZ), subimages (TB11) of the first image (B1) and subimages (TB12) corresponding thereto of the second image (B2) and
- to detect, on the basis of the selected subimages (TB11) of the first image (B1) and of the selected subimages (TB12) of the second image (B2), respective actual presence of respective cellular fluorescence pattern types by means of a convolutional neural network (CNN2).

13. Data network apparatus (DV) comprising
- at least one data interface (DS4) for receiving a first image (B1) which represents staining of a biological cell substrate by a first fluorescent dye, wherein the biological cell substrate comprises human epithelioma cells, and for receiving a second image (B2) which represents staining of the biological cell substrate by a second fluorescent dye,
- characterized by a computing unit (R) according to embodiment 12.

14. Computer program product (CPP)
- comprising commands which, on execution of the program by a computer (CO), cause the latter to carry out the method for digital image processing according to embodiment 11.

15. Data carrier signal (SIG2) which transfers the computer program product (CPP) according to embodiment 14.

An object of the invention is achieved by the proposed method according to embodiment 1. the proposed apparatus according to embodiment 9, the proposed method according to embodiment 10, the proposed method for digital image processing according to embodiment 11, the proposed computing unit according to embodiment 12, the data network apparatus according to embodiment 13, the proposed computer program product according to embodiment 14 and the proposed data carrier signal according to embodiment 15.

BRIEF DESCRIPTION OF THE DRAWINGS

FIG. 11 shows various exemplary nuclear antibody fluorescence pattern types.

FIG. 12b shows a key to FIG. 12a.

FIG. 16a shows the second subimage from FIG. 14.

FIG. 16b shows a feature map of a specific fluorescence pattern type together with an associated overlay image.

FIG. 16c shows a feature map for another specific fluorescence pattern type together with an associated overlay image.

FIG. 17a shows a first further fluorescence image.

FIG. 17b shows a highlighted interphase cell and a highlighted mitosing cell relating to the fluorescence image from FIG. 17a.

FIG. 22 shows various feature maps for the subimages from FIG. 21.

FIG. 23b shows a feature map for a specific fluorescence pattern type and a resultant overlay image relating to the subimage from FIG. 23a.

FIG. 25 shows a layer of a convolutional neural network for identifying fluorescence pattern types according to a preferred embodiment.

FIG. 26 shows a convolutional neural network for image segmentation according to a preferred embodiment.

FIG. 27 shows a table with experimental results.

DETAILED DESCRIPTION OF THE INVENTION

Figure 1:
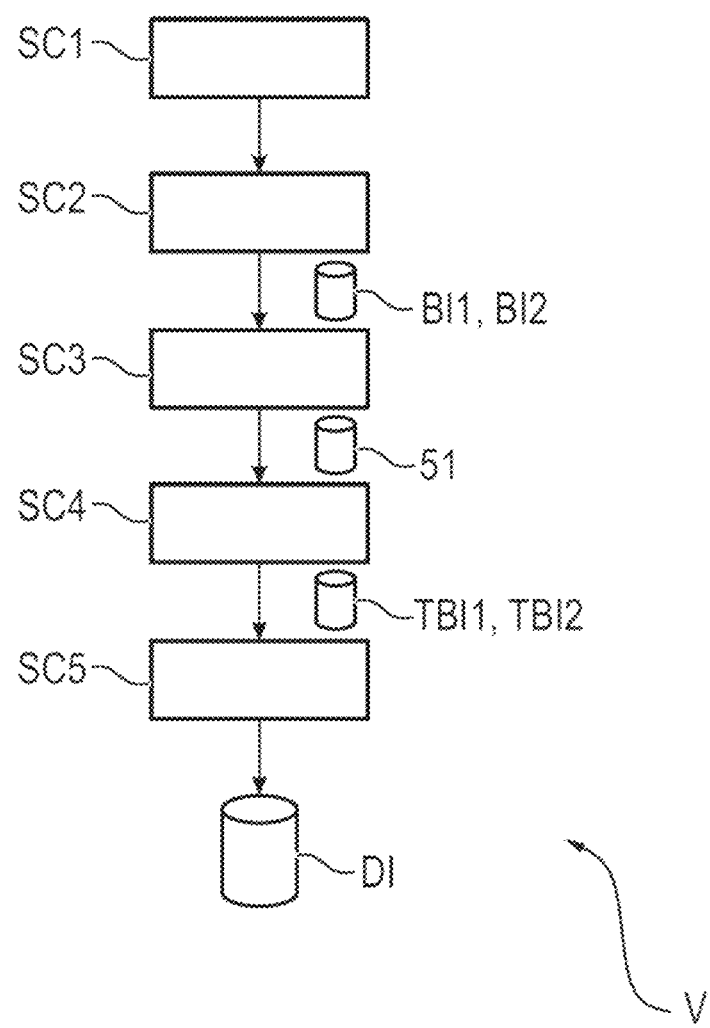
FIG. 1 shows steps of the method according to the invention according to a preferred embodiment.

A method is proposed for detecting respective potential presence of respective different cellular fluorescence pattern types on a biological cell substrate comprising human epithelioma cells, wherein the cellular fluorescence pattern types comprise a plurality of different antinuclear antibody fluorescence pattern types. The method comprises various steps. The cell substrate is incubated with a liquid patient sample which potentially comprises primary antibodies. The liquid patient sample is preferably dilute patient blood, particularly preferably dilute patient blood serum. The cell substrate is further incubated with a first fluorescent dye. The cell substrate is moreover further incubated with secondary antibodies which are labelled with a second fluorescent dye. The cell substrate is further preferably irradiated with excitation radiation. A first image which represents staining of the cell substrate by the first fluorescent dye is further acquired. A second image which represents staining of the cell substrate by the second fluorescent dye is further acquired.

Staining of the cell substrate with the first fluorescent dye gives rise to staining of the cell substrate in the first image which enables optical identification of different cellular regions in relation to their position in the first image. The spatial orientation of the first image is preferably identical to that of the second image. Such a first fluorescent dye binds, non-specifically of a presence of primary antibodies in a patient sample, to cellular regions and thus permits the identification in principle of different cell regions in the first image.

Because the secondary antibodies can bind to such primary antibodies which originate from the liquid patient sample and are bound to specific regions of the cell substrate or cell nucleus, depending on the presence of respective different primary antibody types, respective different antibody fluorescence patterns may be present in the second image and then identified.

The method according to the invention further involves detecting, on the basis of the first image, respective image segments which in each case represent at least one mitotic cell. Subimages of the first image and subimages corresponding thereto of the second image are then further selected on the basis of the detected image segments. Finally, respective actual presence of the respective cellular fluorescence pattern types are further detected by means of a convolutional neural network on the basis of the selected subimages of the first image and of the selected subimages of the second image.

In order to detect different ANA patterns, it would in principle be possible to analyse a complete fluorescence image or the entire second image with a large plurality of human epithelioma cells (HEp cells) and, in order to identify the different ANA patterns, to supply such a complete fluorescence image to a single convolutional neural network to detect the respective presence of the respective fluorescence pattern types. The convolutional neural network (CNN) would then have to evaluate the entirety of all the HEp cells of the image in order to identify the different antinuclear antibody fluorescence pattern types. While it is indeed advantageous for statistical reasons to take as many HEp cells as possible into consideration to ensure accurate detection, there are various disadvantages to doing so. Firstly, the computing power required to process a complete fluorescence image with a large plurality of HEp cells would be very high. Processing a large complete image of this kind with very many HEp cells would further constitute a large degree of freedom of abstract image data. If, during a training phase, the convolutional neural network were to be trained with such large complete fluorescence images, the volume and the variance of abstract image data might possibly be too great for the convolutional neural network to be able to converge sufficiently in the training phase to a state which permits reliable detection of different fluorescence pattern types or fluorescence pattern classes.

The invention accordingly proposes firstly detecting, on the basis of the first image which is stained with the first fluorescent dye non-specifically of antibody binding, specific image segments which in each case represent at least one mitotic cell and then selecting those subimages of the first image and those subimages of the second image which comprise a corresponding image segment with at least one mitotic cell. A mitotic cell is also denoted a mitosing cell. The spatial extent of the image segments is in particular smaller than the subimages.

This firstly gives rise to the advantage that the convolutional neural network in each case need only process one subimage of the second image with antibody-specific fluorescent dye staining and the corresponding subimage of the first image and not a complete first image and a complete second image at once. The convolutional neural network can therefore be trained for a size of such subimages and need only evaluate such subimages with a limited number of HEp cells and thus only a limited volume of abstract image data. The proposed method is further advantageous in particular because it is only such subimages which also contain a mitosing cell that are selected. Because the subimages contain a mitosing cell they are particularly well suited to differentiating different nuclear patterns, since detecting certain nuclear patterns requires considering not only "interphase" cells with regard to the staining thereof by the fluorescent dye but in particular also mitosing cells. This permits differentiation of many fluorescence pattern types. Ensuring that a subimage comprises an image segment with a mitosing cell increases the quality of detection of the respective antinuclear antibody fluorescence pattern types.

In particular, the proposed method is in particular advantageous because, by ensuring that the subimages comprise corresponding segments with at least one mitosing cell, the convolutional neural network can, for detecting respective presence of the respective fluorescence pattern types, also identify any possibly present staining of a metaphase plate of a mitotic cell in order to differentiate between different antinuclear antibody fluorescence pattern types.

Since, in the method according to the invention, the convolutional neural network jointly processes not only the selected subimage of the second image which comprises patient-specific staining with the second fluorescent dye but also a subimage corresponding thereto of the first image which comprises patient-non-specific staining of the cell substrate with the first fluorescent dye, the convolutional neural network can here focus on location data of cell regions or cell nucleus regions which are present in the first subimage and simultaneously also detect the actual patient-specific fluorescence pattern in the subimages of the second image. The convolutional neural network here thus simultaneously evaluates mutually corresponding fluorescence subimages of different colour channels.

Advantageous embodiments of the invention are the subject matter of the dependent claims and are explained in greater detail in the following description with reference in some cases being made to the figures.

The method further preferably involves: detecting, on the basis of the first image, respective image segments which in each case represent at least one mitotic cell of a sufficient quality and selecting subimages of the first image and subimages corresponding thereto of the second image on the basis of the detected image segments which in each case represent at least one mitotic cell of a sufficient quality. For the purposes of the present application, a mitosing cell is of sufficient quality or is then valid if it is at a correct or valid stage of mitosis. A correct or valid stage of mitosis is the "metaphase". A mitosing cell which is not in the metaphase is thus an incorrect or invalid mitosing cell.

The method further preferably involves: determining, on the basis of the selected subimages of the first image and of the selected subimages of the second image, respective confidence measures for the respective actual presence of the respective fluorescence pattern types by means of the convolutional neural network. The respective confidence measures are preferably output.

The convolutional neural network preferably comprises an output layer which generates a respective feature map for a respective cellular fluorescence pattern type, in particular for a respective subimage tuple, wherein the convolutional neural network further determines a respective confidence measure, in particular for a respective subimage tuple, on the basis of a respective feature map. A subimage tuple comprises a subimage of the first image and a subimage corresponding thereto of the second image.

The method further preferably involves: segmenting the first image into image segments of different segment classes, wherein preferably at least one first segment class represents a cell stage of a cell and wherein preferably at least one second segment class represents a cell region within a cell, further determining a lightness value for at least one fluorescence pattern type based on one or more image segments of at least one specific segment class, and further verifying the confidence measure of the fluorescence pattern type on the basis of the lightness value of the fluorescence pattern type.

The confidence measure is preferably verified on the basis of the lightness value and as a function of a user-predeterminable threshold value.

The method further preferably involves: for a respective subimage tuple which comprises a subimage of the first image and a corresponding subimage of the second image, determining respective subimage confidence measures for respective actual subimage presence of respective cellular fluorescence pattern types by means of the convolutional neural network and further determining the respective confidence measures for the respective actual presence of the respective fluorescence pattern types on the basis of the subimage confidence measures.

The method further preferably involves: dividing the second image into a set of subimages in accordance with a predetermined division scheme, selecting subimages of the second image on the basis of the detected image segments and further selecting subimages corresponding thereto of the first image and detecting respective actual presence of respective cellular fluorescence pattern types by means of a convolutional neural network on the basis of the selected subimages of the second image and on the basis of the selected subimages of the first image.

An apparatus according to the invention is further proposed for detecting respective potential presence of respective different cellular fluorescence pattern types on a biological cell substrate comprising human epithelioma cells by means of digital image processing. The apparatus comprises: a holder for the biological substrate which has been incubated with a liquid patient sample which potentially comprises primary antibodies, further with a first fluorescent dye and further with secondary antibodies which are labelled with a second fluorescent dye. The apparatus further comprises: at least one image acquisition unit for acquiring a first image which represents staining of the cell substrate by the first fluorescent dye and for acquiring a second image which represents staining of the cell substrate by the second dye. The apparatus is characterized by at least one computing unit which is configured to detect, on the basis of the first image, respective image segments which in each case represent at least one mitotic cell, further to select, on the basis of the detected image segments, subimages of the first image and subimages corresponding thereto of the second image and further to detect, on the basis of the selected subimages of the first image and of the selected subimages of the second image, respective actual presence of respective cellular fluorescence pattern types by means of a convolutional neural network.

A method is further proposed for detecting respective potential presence of respective different cellular fluorescence pattern types on a biological cell substrate comprising human epithelioma cells by means of digital image processing. The method involves: acquiring a first image which represents staining of a biological cell substrate by a first fluorescent dye and acquiring a second image which represents staining of the biological cell substrate by a second fluorescent dye. The method is characterized by detecting, on the basis of the first image, respective image segments which in each case represent at least one mitotic cell, selecting, on the basis of the detected image segments, subimages of the first image and subimages corresponding thereto of the second image and further detecting, on the basis of the selected subimages of the first image and of the selected subimages of the second image respective actual presence of respective cellular fluorescence pattern types by means of a convolutional neural network.

A method for digital image processing is further proposed. The method involves: receiving a first image which represents staining of a biological cell substrate by a first fluorescent dye, wherein the biological cell substrate comprises human epithelioma cells, and receiving a second image which represents staining of the biological cell substrate by a second fluorescent dye. The method is characterized by detecting, on the basis of the first image, respective image segments which in each case represent at least one mitotic cell, further selecting, on the basis of the detected image segments, subimages of the first image and subimages corresponding thereto of the second image and further detecting, on the basis of the selected subimages of the first image and of the selected subimages of the second image, respective actual presence of respective cellular fluorescence pattern types by means of a convolutional neural network.

A computing unit is further proposed which, in the course of digital image processing, is configured to receive a first image which represents staining of a biological cell substrate by a first fluorescent dye, wherein the biological cell substrate comprises human epithelioma cells, and to receive a second image which represents staining of the biological cell substrate by a second fluorescent dye. The computing unit is characterized in that it is further configured to detect, on the basis of the first image, respective image segments which in each case represent at least one mitotic cell, to select, on the basis of the detected image segments, subimages of the first image and subimages corresponding thereto of the second image and to detect, on the basis of the selected subimages of the first image and of the selected subimages of the second image, respective actual presence of respective cellular fluorescence pattern types by means of a convolutional neural network.

A data network apparatus is further proposed which comprises at least one data interface for receiving a first image which represents staining of a biological cell substrate by a first fluorescent dye, wherein the biological cell substrate comprises human epithelioma cells, and for receiving a second image which represents staining of the biological cell substrate by a second fluorescent dye. The data network apparatus further comprises a computing unit according to the invention.

A computer program product is further proposed which comprises commands which, on execution of the program by a computer, cause the latter to carry out the method for digital image processing according to the invention.

A data carrier signal which transfers the computer program product is further proposed.

Without limiting the general concept of the invention, the invention is explained in greater detail below with reference to the figures and on the basis of specific embodiments.

Figure 2:
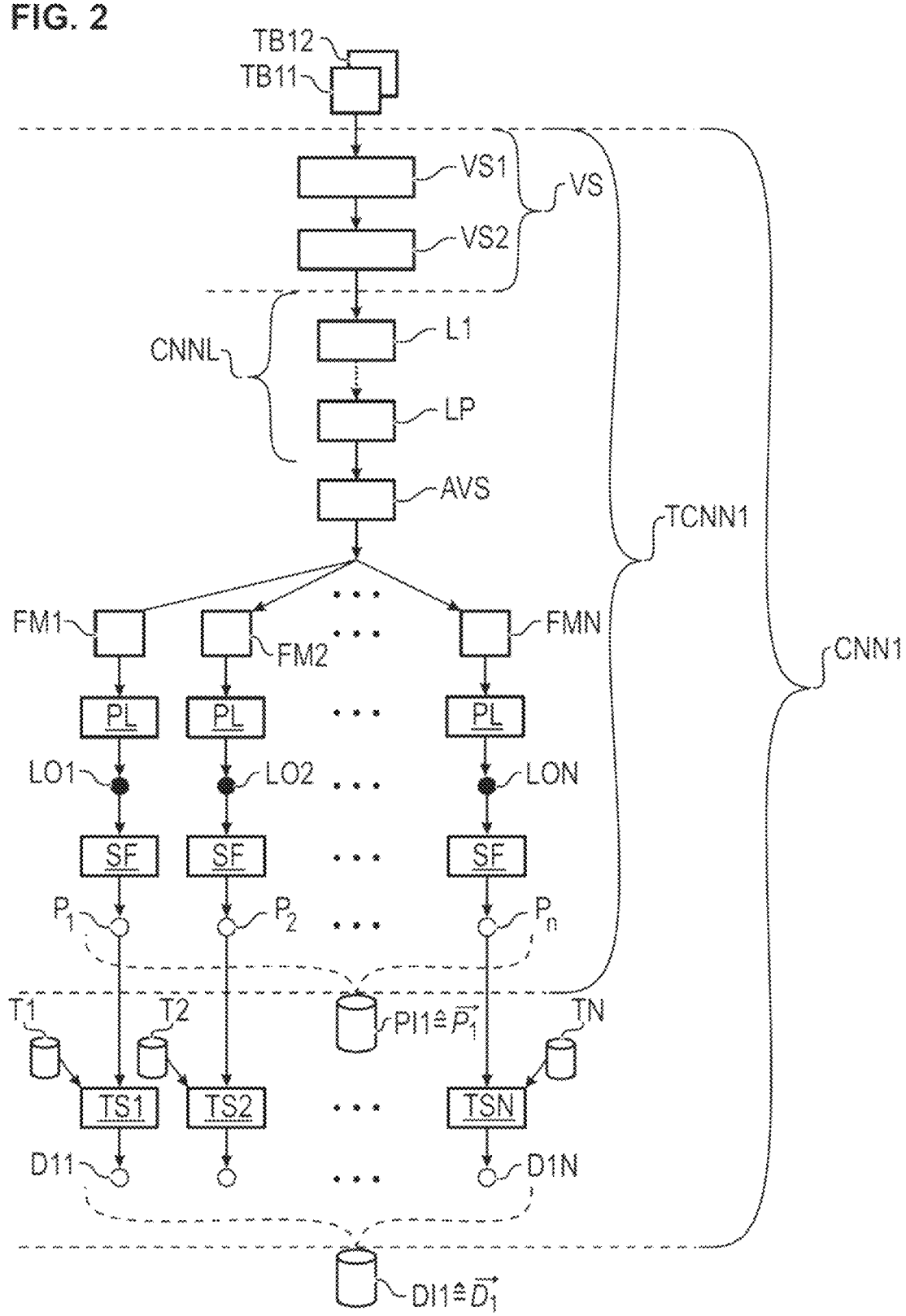
FIG. 2 shows processing of subimages by a convolutional neural network according to a preferred embodiment.
Figure 3:
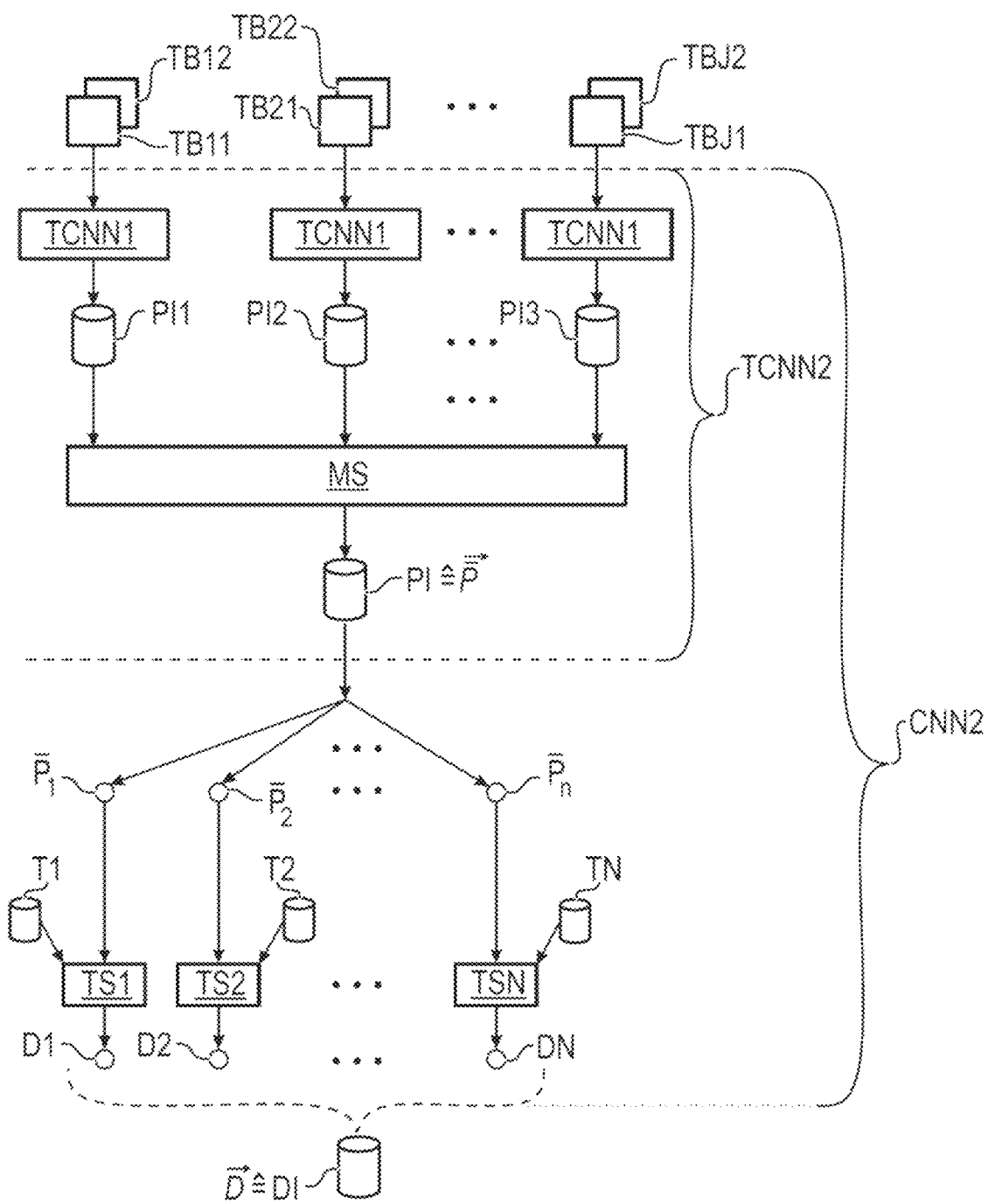
FIG. 3 shows processing of a plurality of subimages by a convolutional neural network according to a preferred embodiment.
Figure 4:
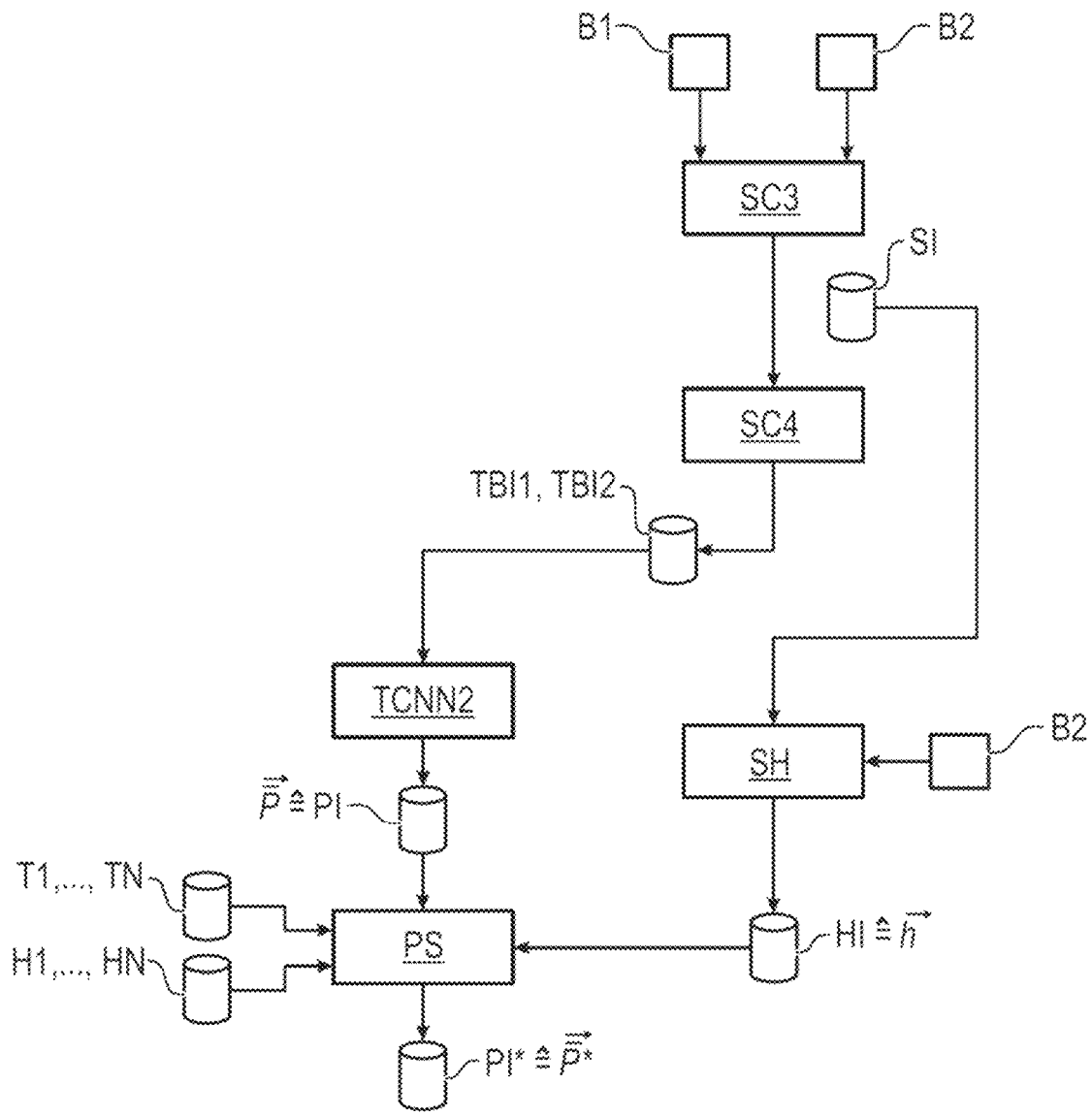
FIG. 4 shows steps for segmenting the first image and verifying confidence measures on the basis of determined lightness values according to a preferred embodiment.
Figure 5:
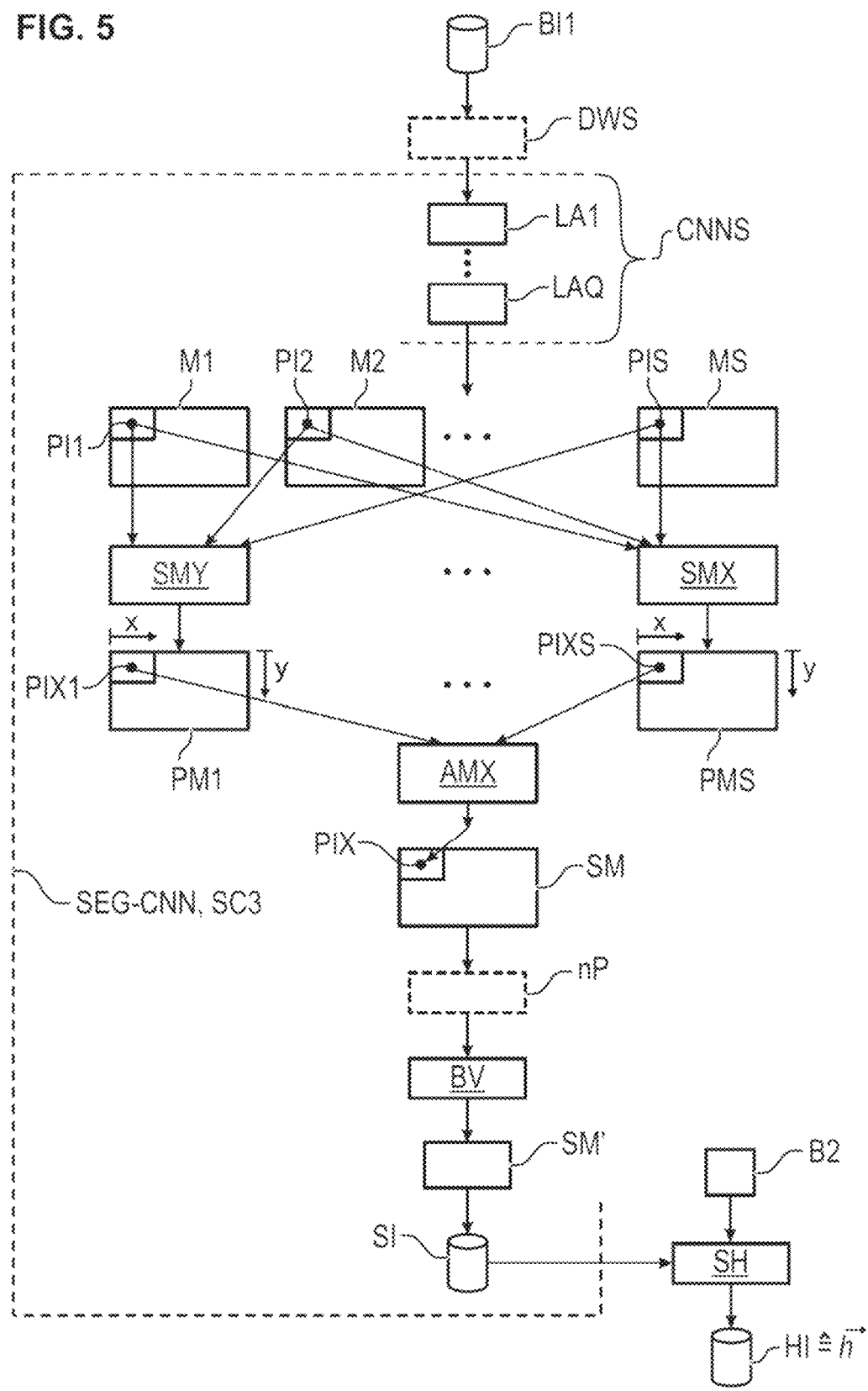
FIG. 5 shows detailed steps of a method for segmenting the first image according to a preferred embodiment.
Figure 6:
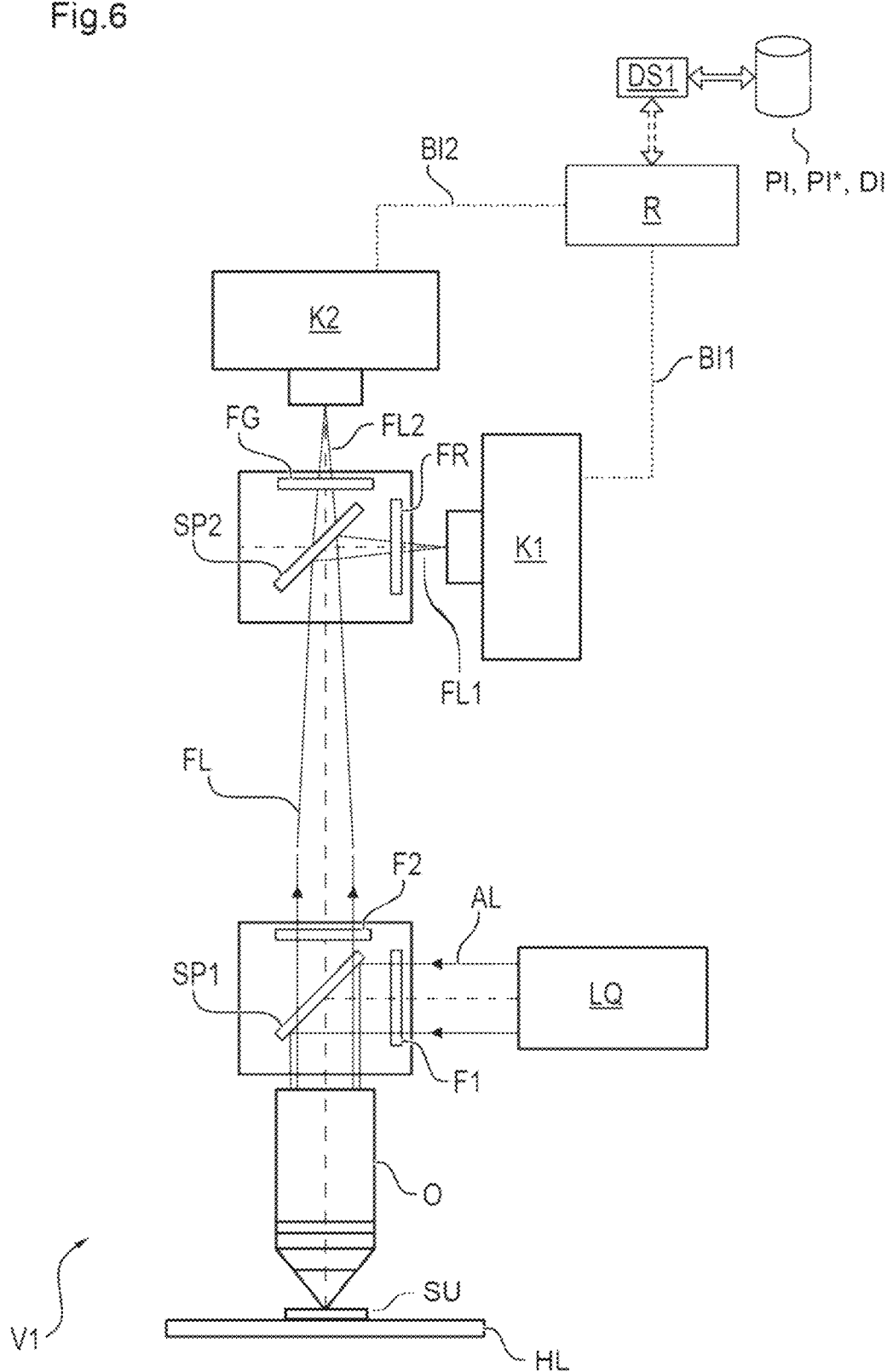
FIG. 6 shows a proposed apparatus according to a preferred embodiment.
Figure 7A:
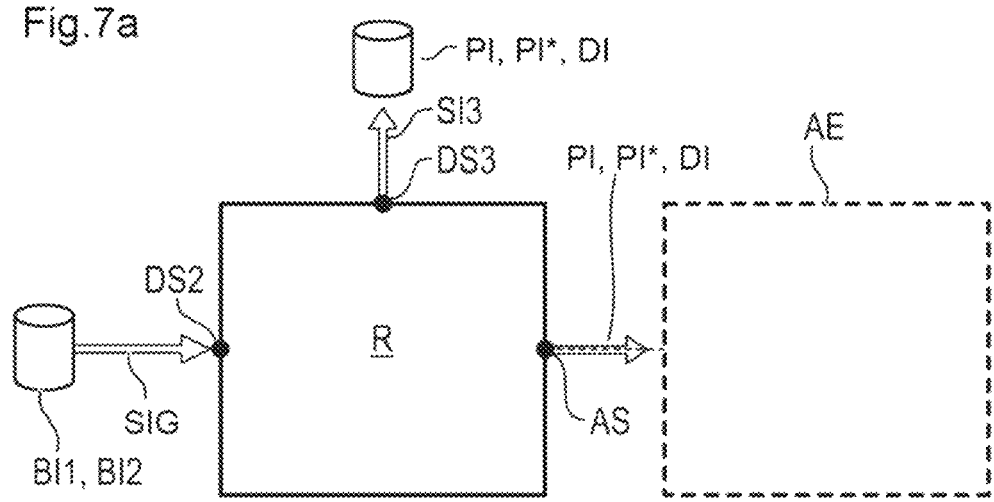
FIG. 7a shows a proposed computing unit according to a preferred embodiment.
Figure 7B:
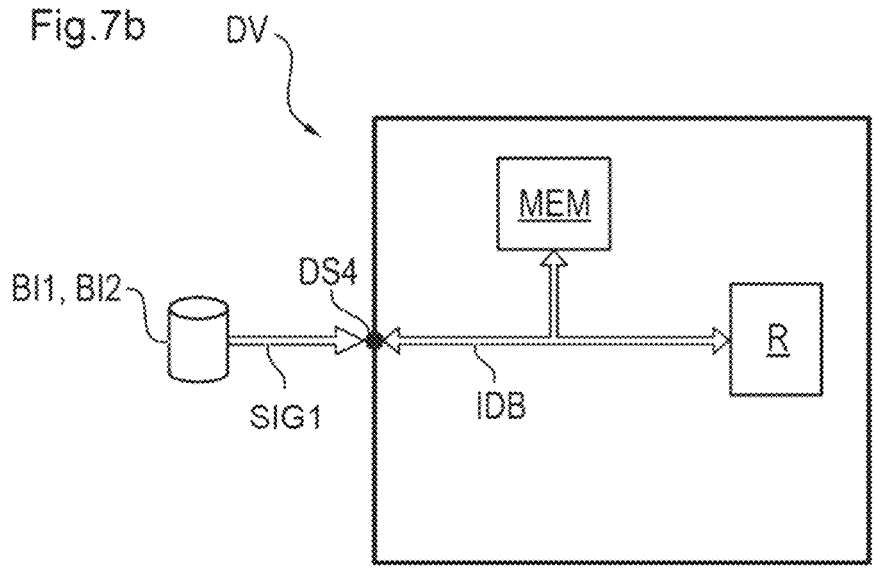
FIG. 7b shows a proposed data network apparatus according to a preferred embodiment.
Figure 7C:
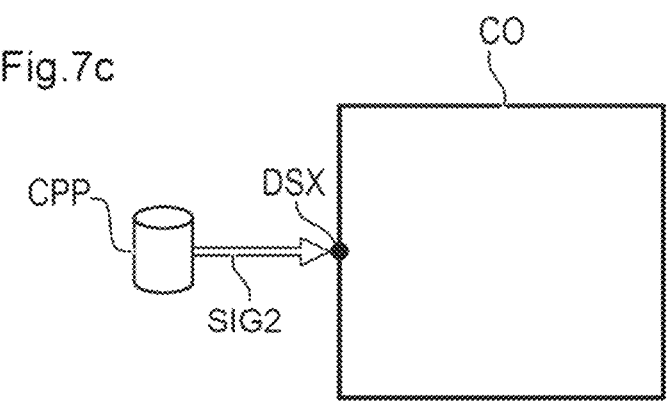
FIG. 7c shows a proposed computer program product and a data carrier signal according to a preferred embodiment.
Figure 8:
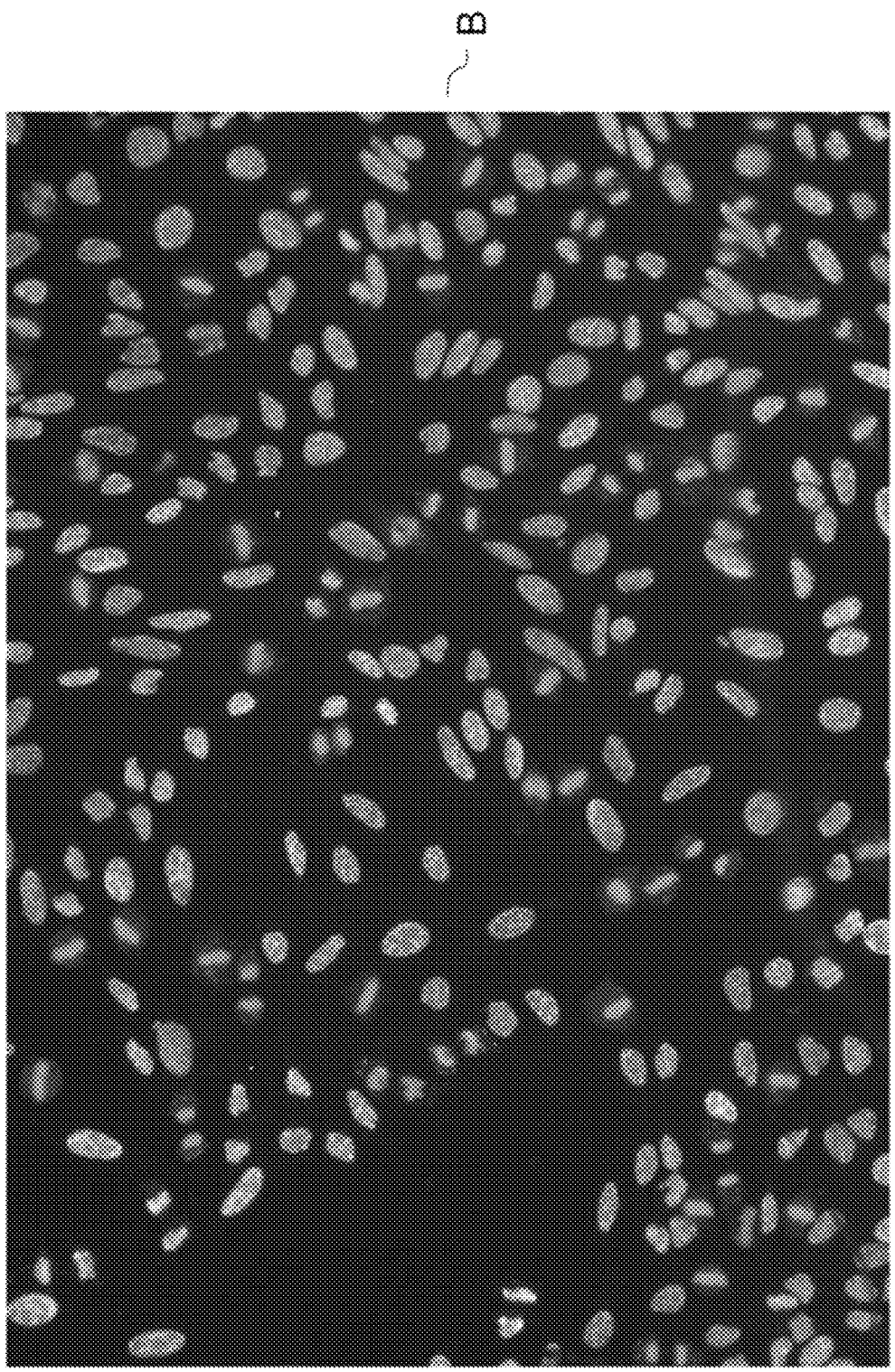
FIG. 8 shows a fluorescence image made up of two overlaid colour channels.
Figure 9:
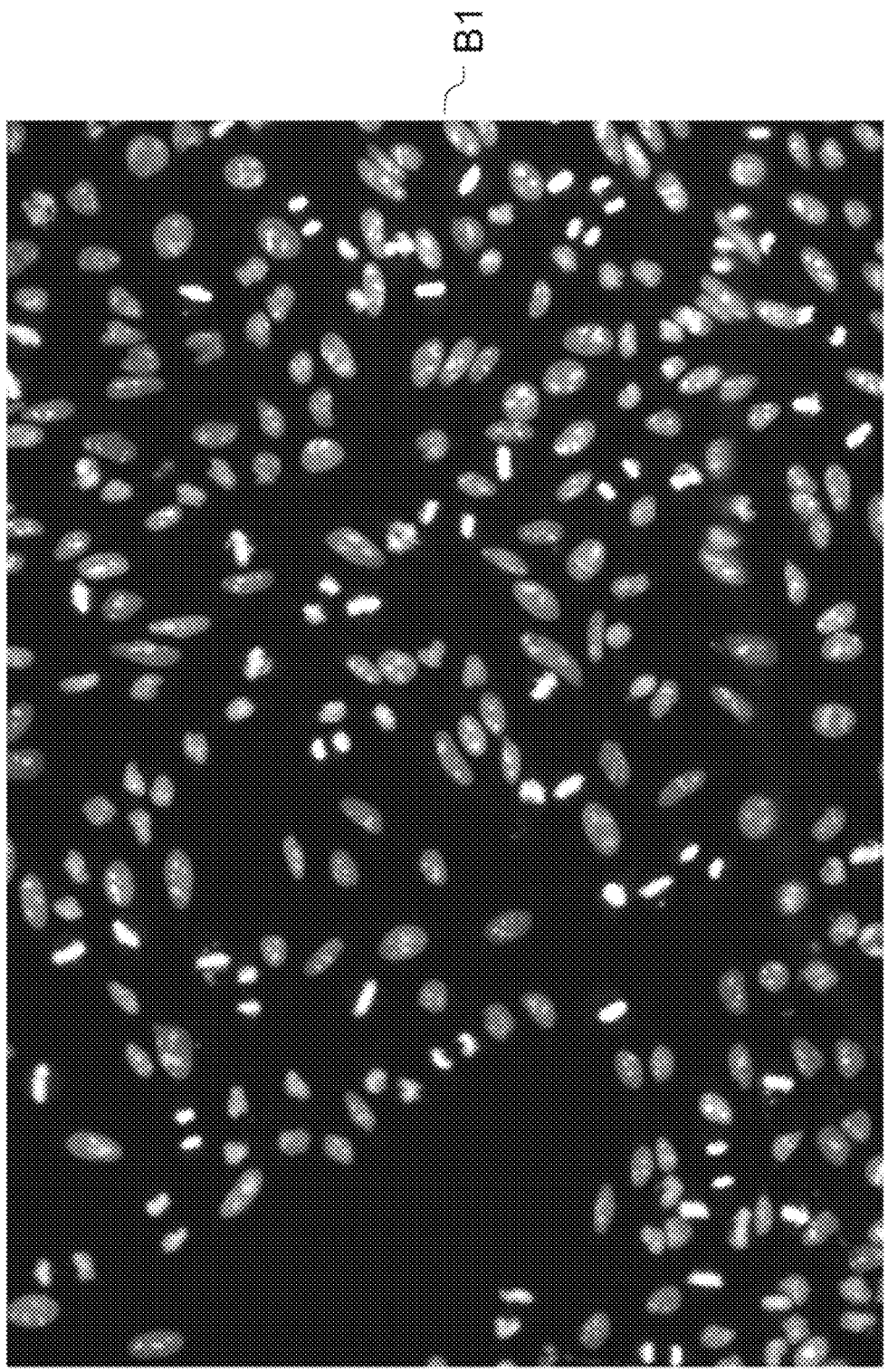
FIG. 9 shows a first fluorescence image of a first colour channel.
Figure 10:
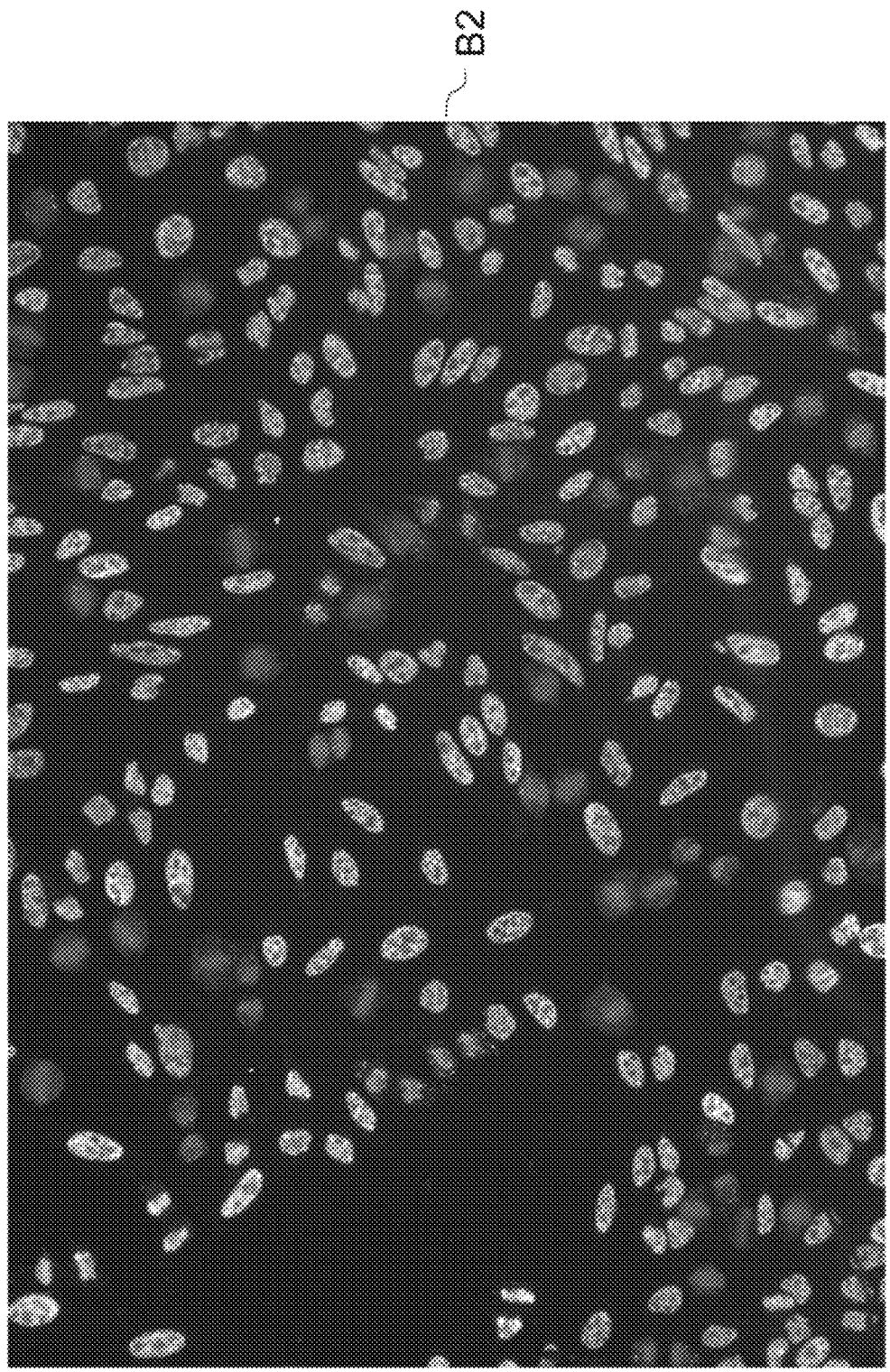
FIG. 10 shows a second fluorescence image of a second colour channel.
Figure 12B:
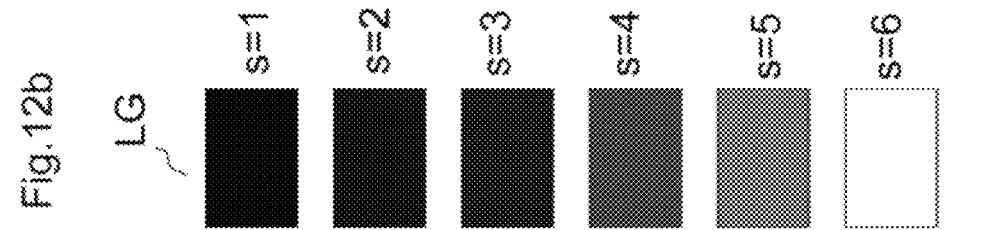
Figure 12A:
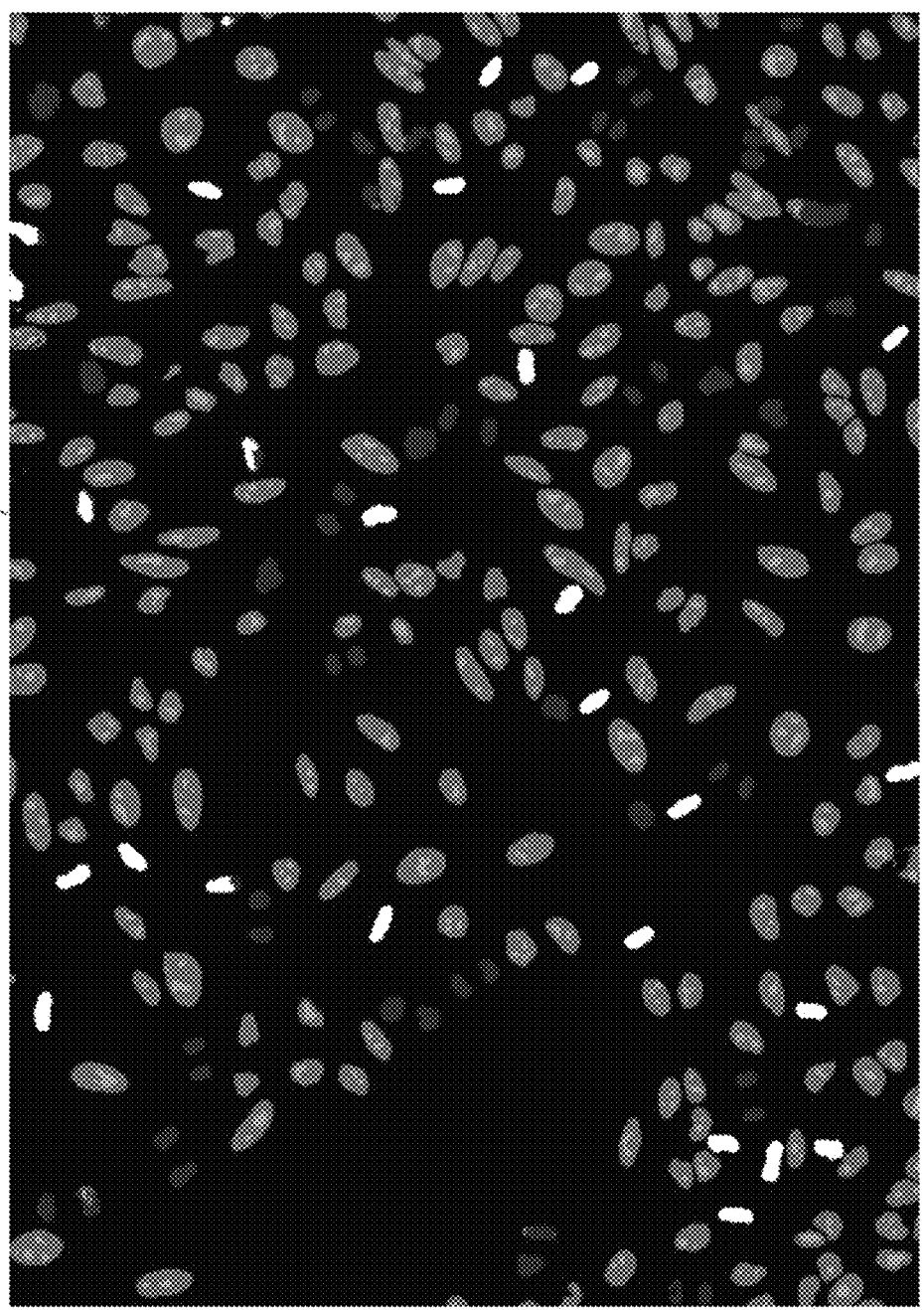
FIG. 12a shows a segmented fluorescence image.
Figure 13:
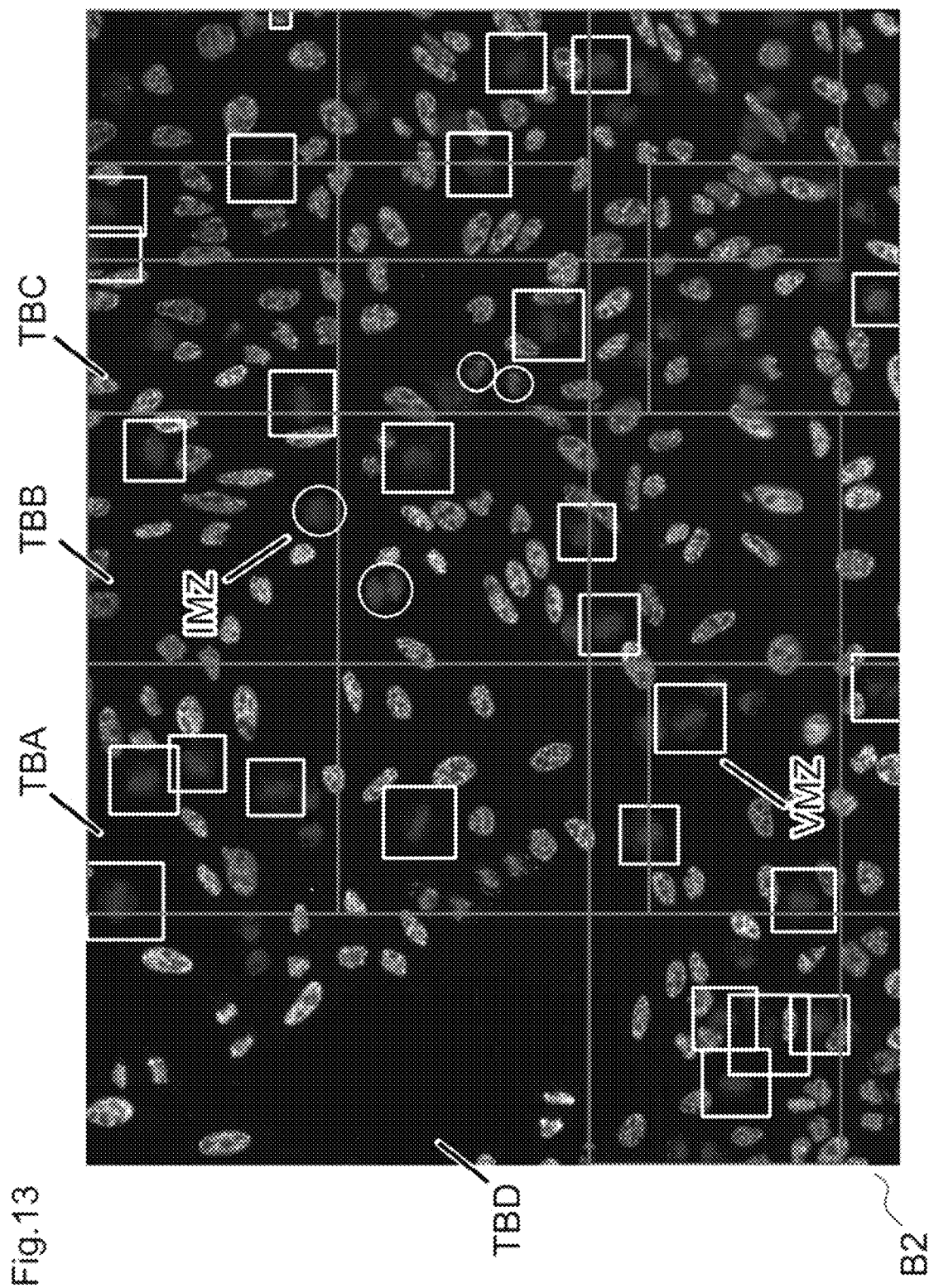
FIG. 13 shows a division of the fluorescence image into subimages and highlights various mitosing cells.
Figure 14:
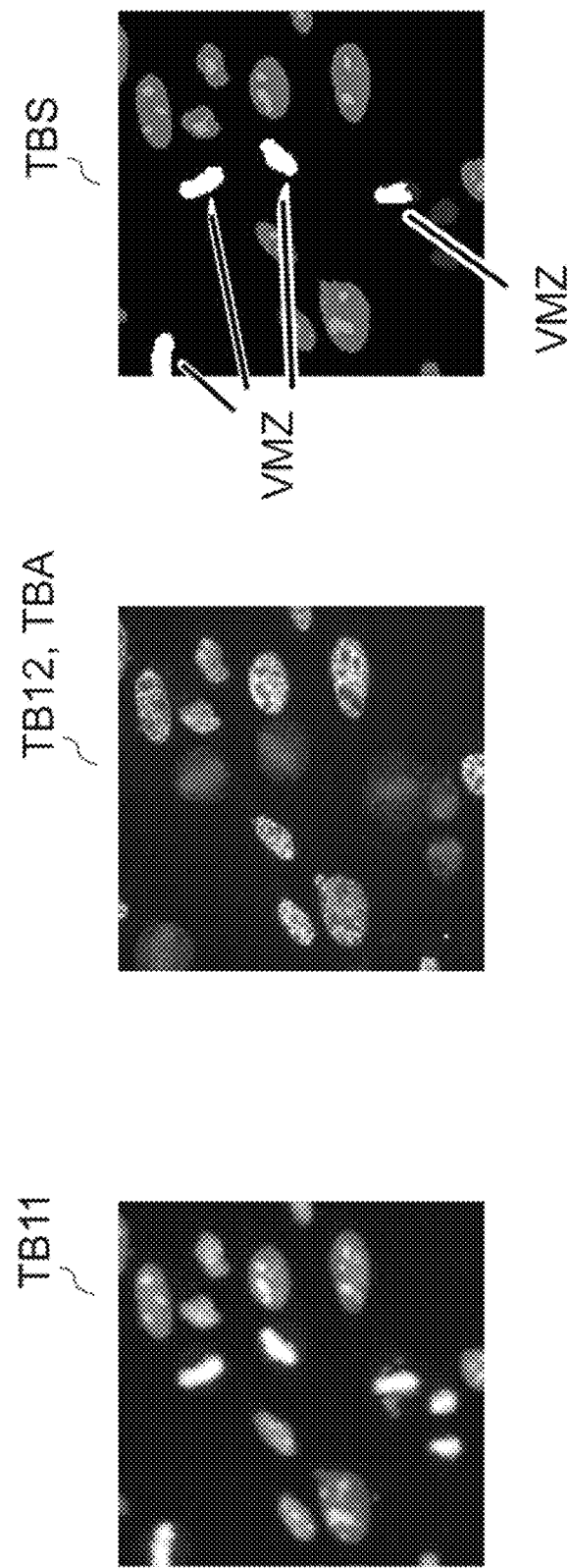
FIG. 14 shows a first subimage, a second subimage and a segmented subimage.
Figure 15:
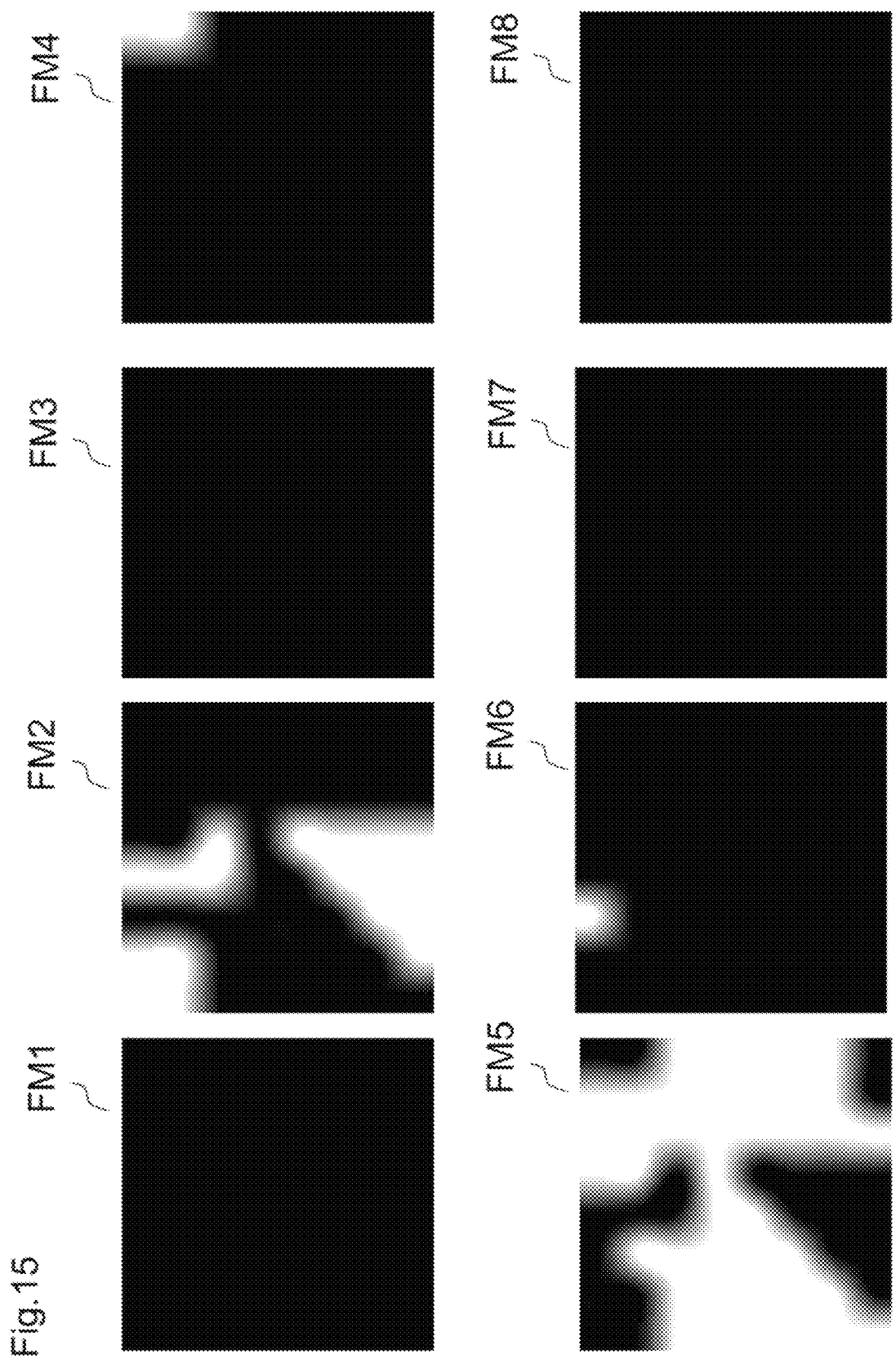
FIG. 15 shows various feature maps for various fluorescence pattern types or fluorescence pattern classes.
Figure 18:
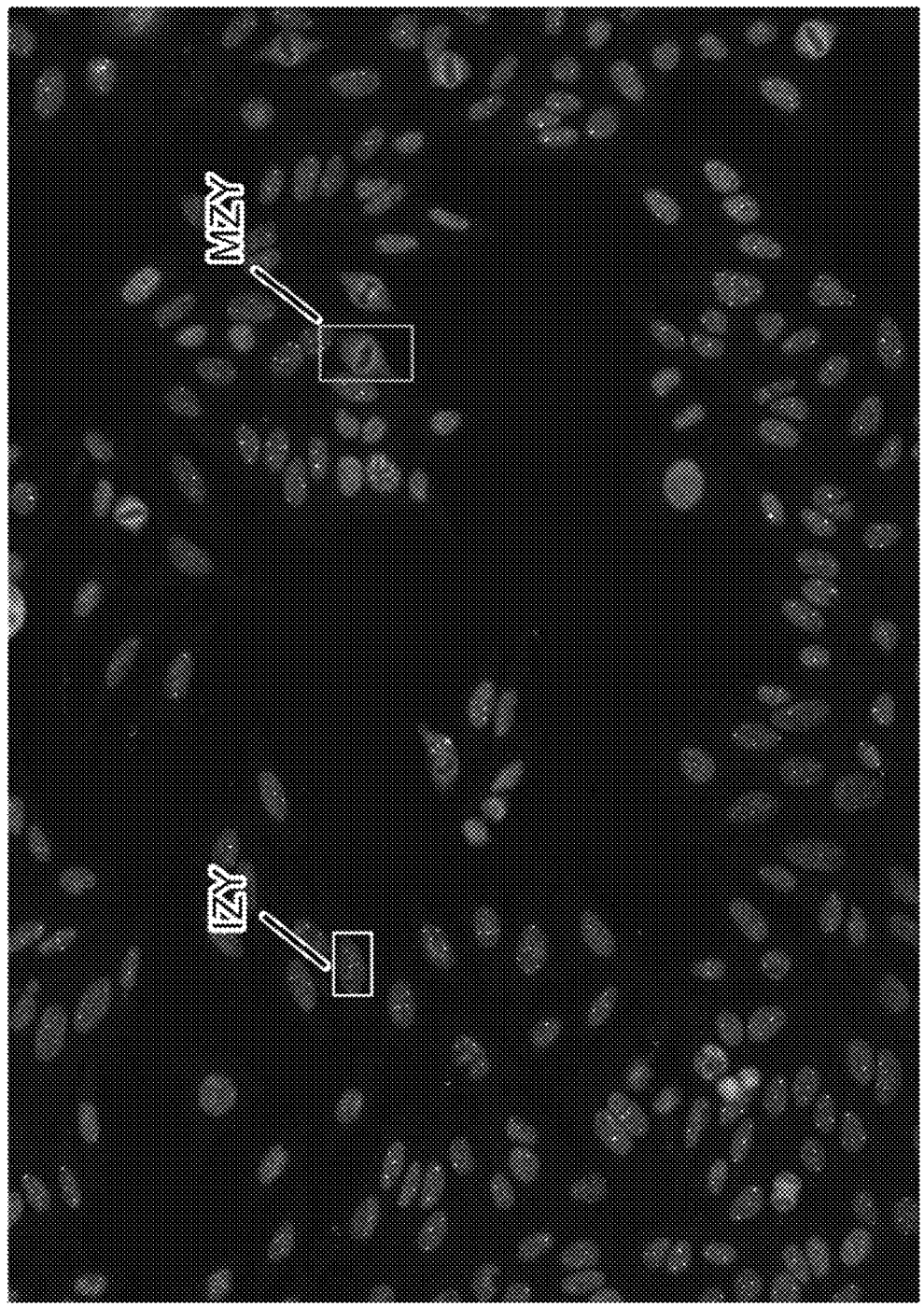
FIG. 18 shows a second further fluorescence pattern image.
Figure 19B:
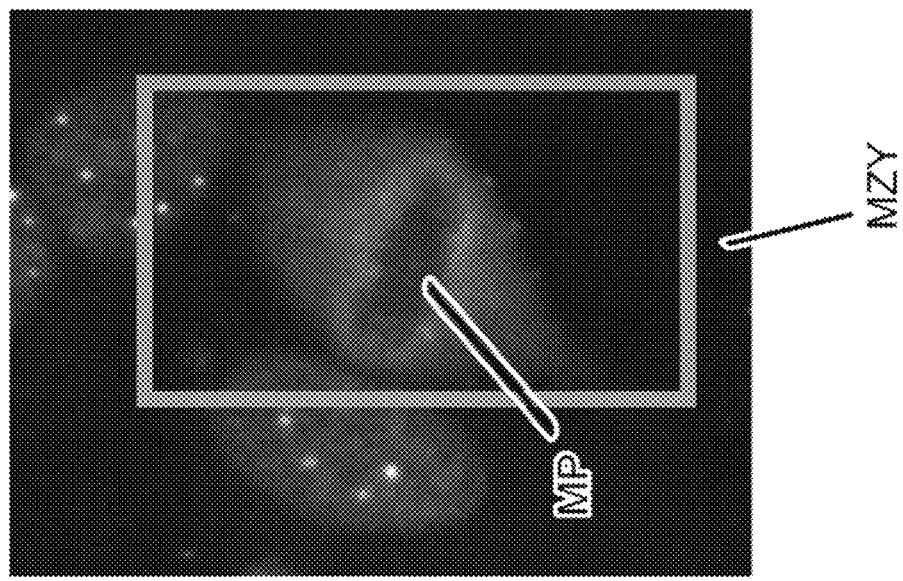
FIG. 19b shows a highlighted mitosing cell relating to the fluorescence pattern image from FIG. 18.
Figure 19A:
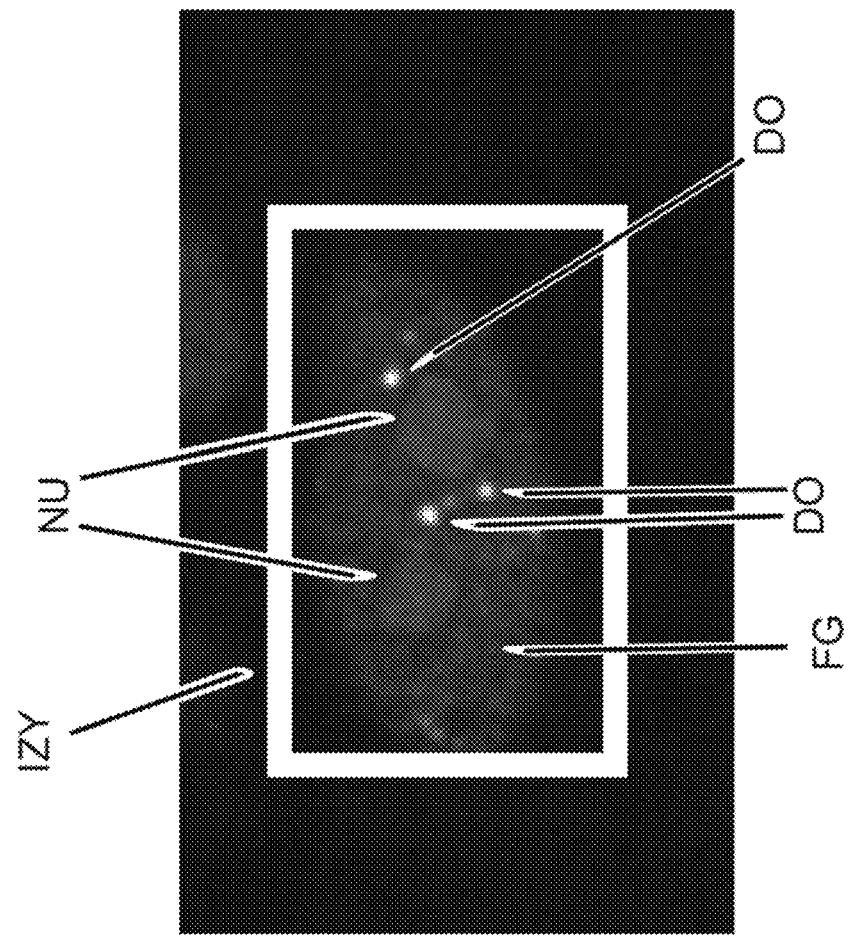
FIG. 19a shows a highlighted interphase cell relating to the fluorescence pattern image from FIG. 18.
Figure 20:
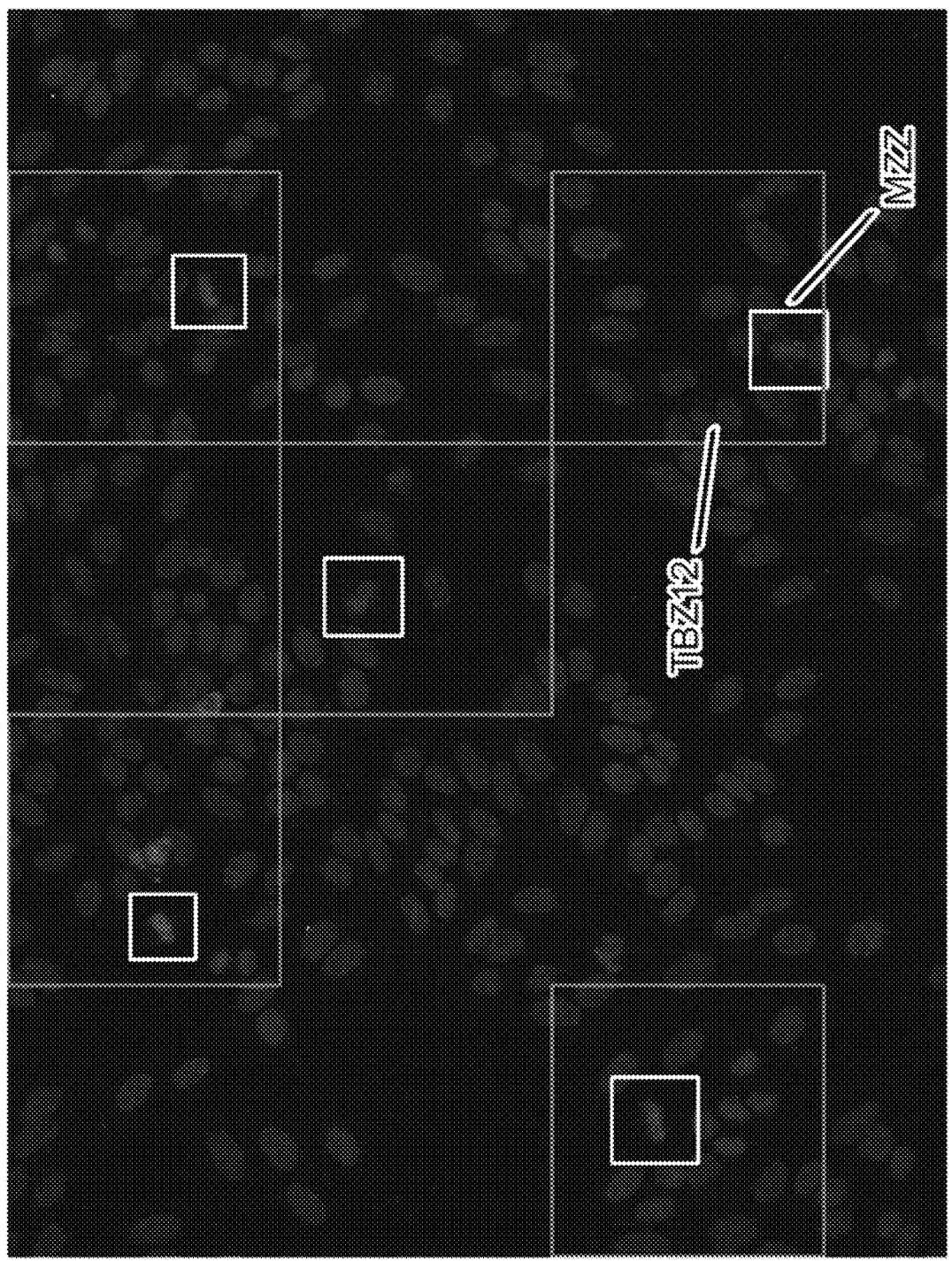
FIG. 20 shows a third further fluorescence pattern image with highlighted subimages and highlighted mitosing cells.
Figure 21:
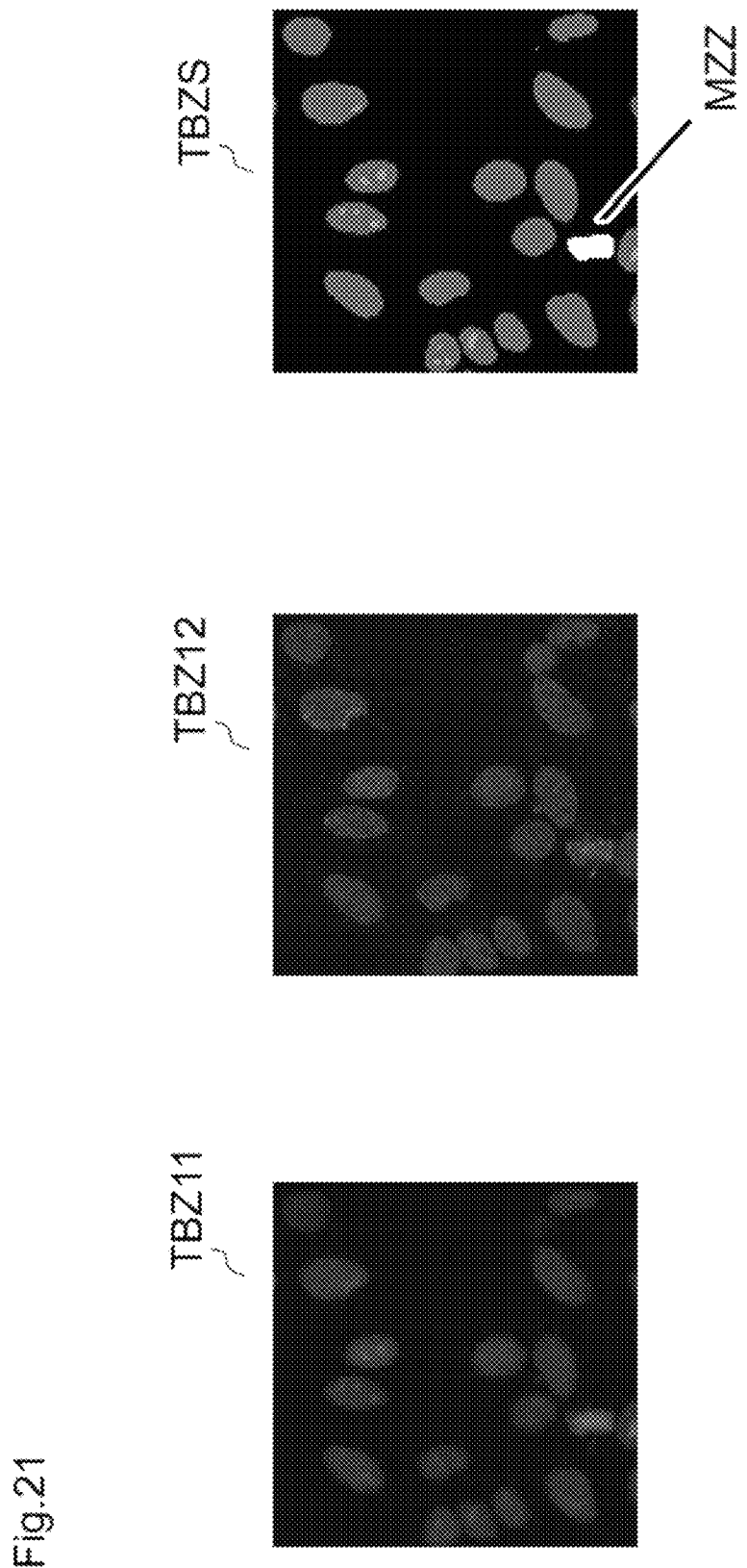
FIG. 21 shows a first and a second subimage and a segmented subimage relating to the fluorescence pattern image from FIG. 20.
Figure 23C:
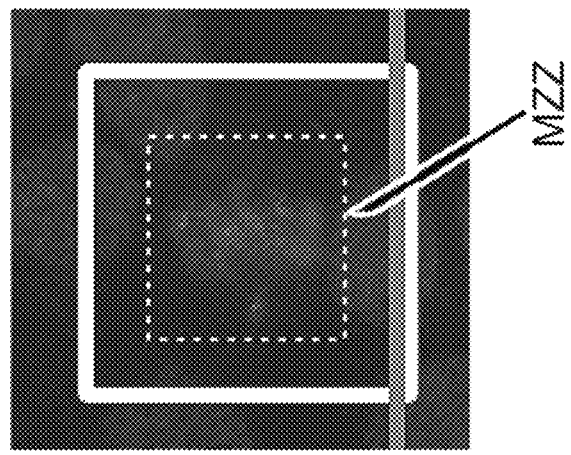
FIG. 23c shows a magnified representation of a mitosing cell from the second subimage from FIG. 23a or from FIG. 20.
Figure 23B:
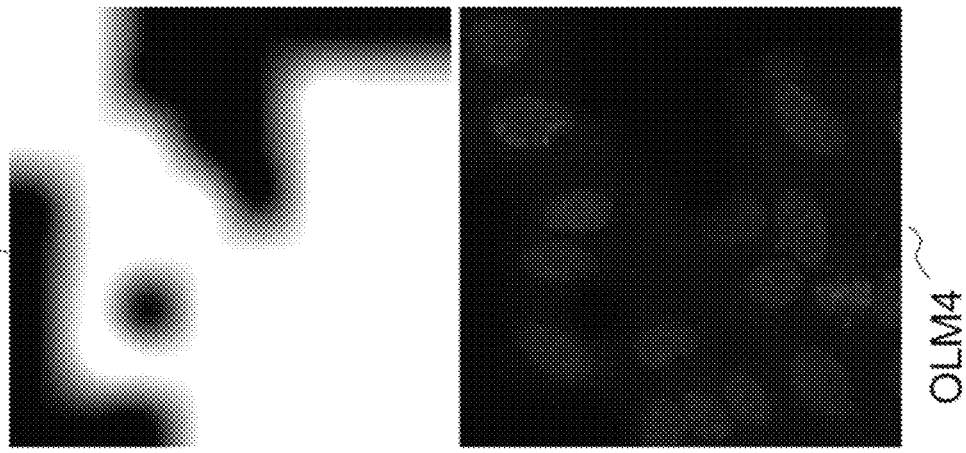
Figure 23A:
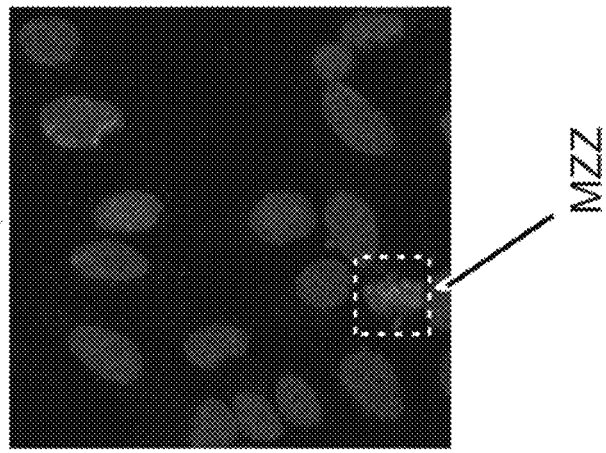
FIG. 23a shows the second subimage from FIG. 21.
Figure 24:
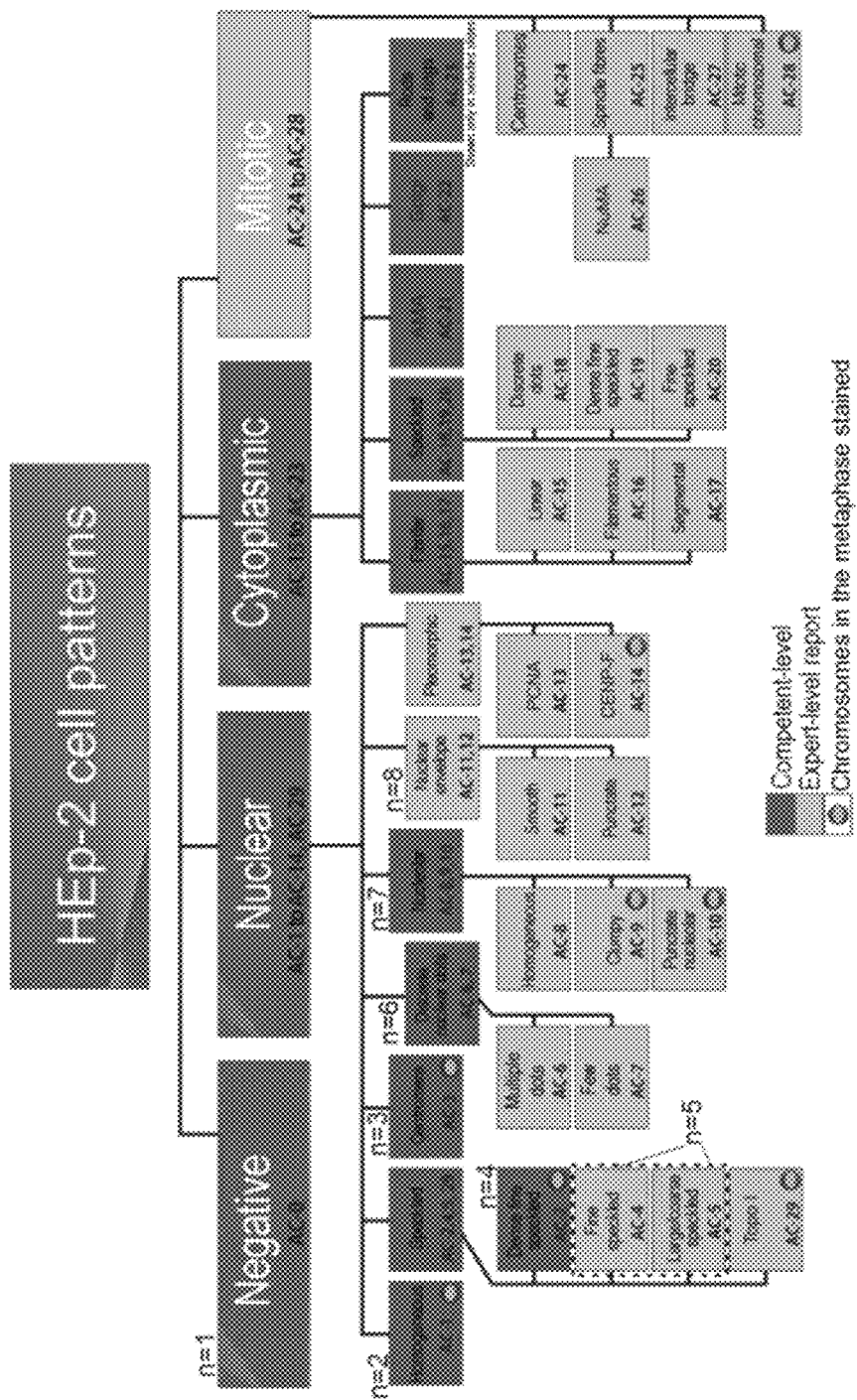
FIG. 24 shows a classification scheme for various fluorescence pattern types.

FIG. 1 shows steps of the method according to the invention according to a preferred embodiment, FIG. 2 shows processing of subimages by a convolutional neural network according to a preferred embodiment, FIG. 3 shows processing of a plurality of subimages by a convolutional neural network according to a preferred embodiment, FIG. 4 shows steps for segmenting the first image and verifying confidence measures on the basis of determined lightness values according to a preferred embodiment, FIG. 5 shows detailed steps of a method for segmenting the first image according to a preferred embodiment, FIG. 6 shows a proposed apparatus according to a preferred embodiment, FIG. 7a shows a proposed computing unit according to a preferred embodiment, FIG. 7b shows a proposed data network apparatus according to a preferred embodiment, FIG. 7c shows a proposed computer program product and a data carrier signal according to a preferred embodiment, FIG. 8 shows a fluorescence image made up of two overlaid colour channels, FIG. 9 shows a first fluorescence image of a first colour channel, FIG. 10 shows a second fluorescence image of a second colour channel, FIG. 11 shows various exemplary nuclear antibody fluorescence pattern types, FIG. 12a shows a segmented fluorescence image, FIG. 12b shows a key to FIG. 12a, FIG. 13 shows a division of the fluorescence image into subimages and highlights various mitosing cells, FIG. 14 shows a first subimage, a second subimage and a segmented subimage, FIG. 15 shows various feature maps for various fluorescence pattern types or fluorescence pattern classes, FIG. 16a shows the second subimage from FIG. 14, FIG. 16b shows a feature map of a specific fluorescence pattern type together with an associated overlay image, FIG. 16c shows a feature map for another specific fluorescence pattern type together with an associated overlay image, FIG. 17a shows a first further fluorescence image, FIG. 17b shows a highlighted interphase cell and a highlighted mitosing cell relating to the fluorescence image from FIG. 17a, FIG. 18 shows a second further fluorescence pattern image, FIG. 19a shows a highlighted interphase cell relating to the fluorescence pattern image from FIG. 18, FIG. 19b shows a highlighted mitosing cell relating to the fluorescence pattern image from FIG. 18, FIG. 20 shows a third further fluorescence pattern image with highlighted subimages and highlighted mitosing cells, FIG. 21 shows a first and a second subimage and a segmented subimage relating to the fluorescence pattern image from FIG. 20, FIG. 22 shows various feature maps for the subimages from FIG. 21, FIG. 23a shows the second subimage from FIG. 21, FIG. 23b shows a feature map for a specific fluorescence pattern type and a resultant overlay image relating to the subimage from FIG. 23a, FIG. 23c shows a magnified representation of a mitosing cell from the second subimage from FIG. 23a or from FIG. 20, FIG. 24 shows a classification scheme for various fluorescence pattern types, FIG. 25 shows a layer of a convolutional neural network for identifying fluorescence pattern types according to a preferred embodiment.

FIG. 26 shows a convolutional neural network for image segmentation according to a preferred embodiment, FIG. 27 shows a table with experimental results.

FIG. 8 shows fluorescence pattern image B which is made up of two overlaid colour channels and has a grey colour which represents staining of a cell substrate by a first fluorescent dye in a "red" channel as a first colour channel as well as an overlaid staining of the cell substrate by a second fluorescent dye in a "green" channel as a second colour channel.

Following incubation of the cell substrate shown here, which comprises HEp cells, with a first fluorescent dye, preferably propidium iodide, certain cell regions are stained, as shown in image B1 in FIG. 9. The HEp cells are preferably what are known as HEp2 cells.

Following incubation of the cell substrate shown here with a dilute patient-specific blood serum and consequent binding of primary autoantibodies, staining in a green channel, shown in FIG. 10 as a second image B2, is obtained following further incubation of the cell substrate with secondary antibodies which are labelled with a second fluorescent dye. The second fluorescent dye is preferably fluorescein isothiocyanate (FITC).

It is apparent that staining by the first fluorescent dye in the first image B1 permits the identification in principle of cell structures or cell regions. Differentiated, pattern-like staining of cell regions in the second image B2 of the green channel further permits differentiated identification of a presence of fluorescence pattern types.

In the second image B2 from FIG. 10, there is no need for just one individually stained pattern or one individual antinuclear antibody fluorescence pattern of a specific pattern type to be present, a plurality of such antinuclear antibody fluorescence pattern types may also occur.

The first image B1 and the second image B2 may be acquired by means of at least one image acquisition unit in the form of one or more cameras K1 and K2 of an apparatus V1 from FIG. 6. In the event that the first image B1 in the first colour channel is acquired as image data B11 by a first image acquisition unit K1 and that further the second image B2 in the second colour channel is acquired as image data B2 by a separate second image acquisition unit K2, images B1 and B2 may be spatially oriented relative to one another prior to further processing so that specific image areas of the first image B1 correspond with their corresponding pixel indices to specific image areas of the second image with identical pixel indices. It is, however, also possible by appropriately configuring the apparatus V1 with regard to optical components and optical filters to acquire both images B1 and B2 by means of a single image acquisition unit or a single camera which has a sensor capable of acquiring images in both colour channels separately from one another, thus for example a colour sensor.

FIG. 11 shows various antinuclear antibody fluorescence pattern types BM1-BM8. Pattern type BM1 is known as negative staining which occurs when none of the further antinuclear antibody fluorescence pattern types to be detected is present. This corresponds to pattern AC-0 from FIG. 24 with the pattern index n=1 used here by way of example. The exemplary pattern classification from FIG. 24 originates from the source www.anapatterns.org/trees-full-.php.

Pattern BM2 is known as homogeneous staining or homogeneous pattern type and is denoted AC-1 in FIG. 24 with the pattern index n=2 used here by way of example.

The pattern type of pattern BM3 is known as centromere staining and is denoted AC-3 in FIG. 24 with the pattern index n=3 used here by way of example.

Pattern type BM4 is known as dense fine speckling and is denoted pattern type AC-2 in FIG. 24 with the pattern index n=4 used here by way of example.

Pattern type BM5 is known as a fine or large/coarse speckled pattern and is denoted AC4 or AC5 in FIG. 24 with the pattern index n=5 used here by way of example.

Pattern type BM6 is the pattern type known as discrete nuclear dots and is denoted pattern type AC-6, 7 in FIG. 24 with the pattern index n=6 used here by way of example.

Pattern type BM7 is known as a nucleolar pattern type and is denoted AC-8, 9, 10 in FIG. 24 with the pattern index n=7 used here by way of example.

Pattern type BM8 is known as the nuclear envelope or nuclear membrane pattern type and is denoted pattern type AC-11, 12 in FIG. 8 with the pattern index n=8 used here by way of example.

The various antinuclear antibody fluorescence pattern types thus comprise homogeneous patterns (AC-1), speckled patterns (AC-2, 4, 5), a centromere pattern (AC-3), discrete nuclear dot patterns (AC-6, 7), nucleolar patterns (AC-8, 9, 10) together with the nuclear envelope fluorescence pattern types (AC-11, 12). A further fluorescence pattern type class is known as the negative class (AC-0) in the case of a patient sample without specific primary antinuclear antibodies.

Image B from FIG. 8 is a fluorescence image selected by way of example, for which the second image B2 from the green channel in FIG. 10 includes both a presence of the homogeneous pattern (AC-1) and a fine or large/coarse speckled pattern (AC-4, AC-5). The manner in which the convolutional neural network proposed here is capable of detecting these two pattern types will be further addressed below.

FIG. 1 shows the essential steps of the method V according to the invention. In a first step SC1, the cell substrate is incubated as previously explained.

In step SC2, the first image and the second image are acquired such that first image data BI1 and second image data BI2 are provided.

In a subsequent step SC3, respective image segments which in each case represent at least one mitotic cell are detected on the basis of the first image or the first image data BI1. This gives rise to what is known as segmentation data SI Such segmentation data SI is shown as an image SB in FIG. 12a. FIG. 12b shows in this connection the various segment classes s=1–S for S=6 different grayscale values which here indicate the various segment classes in image SB from FIG. 12a. The first segment class s=1 is known as a background class. A second class s=2 indicates a cell boundary. A third class s=3 indicates a poor mitosing cell or a mitosing cell of insufficient quality, alternatively also denoted an invalid mitosing cell. For the purposes of the present application, a mitosing cell is of insufficient quality or is invalid if it is at an incorrect or invalid stage of mitosis. A further class s=4 indicates an interphase cell. A further class s=5 indicates a region with nucleoli. A further class s=6 indicates a "good" mitosing cell or a mitosing cell of sufficient quality, also denoted valid mitosing cells. For the purposes of the present application, a mitosing cell is of sufficient quality or is valid if it is at a correct or valid stage of mitosis. A correct or valid stage of mitosis is the "metaphase". A mitosing cell which is not in the metaphase is thus an incorrect or invalid mitosing cell.

According to FIG. 1, in step SC4 subimages of the first image and subimages corresponding thereto of the second image are selected on the basis of the detected image segments which in each case represent at least one mitotic cell.

FIG. 13 once again shows in this connection the second image B2 which is subdivided into subimages TBA, TBB, TBC, TBD and also further subimages. Mitosing cells VMZ which are present and which are preferably of sufficient quality are indicated by means of white squares. Subimage TBD is not selected here as it comprises no mitosing cells MN. White circles indicate mitosing cells IMZ of insufficient quality.

The second image B2 may preferably be divided into matching subimages in such a manner that, on the basis of location information about mitosing cells from image SB of FIG. 12a, it is concluded whether such a mitosing cell of preferably sufficient quality is present within a subimage of the first image and the part corresponding thereto of the second image. Image segments which in each case represent at least one mitotic cell of preferably sufficient quality are detected on the basis of the first image B1 from FIG. 9.

FIG. 13 shows in this connection the second image B2 correspondingly divided into subimages and detected image segments which comprise the mitosing cells VMZ of preferably sufficient quality.

The first image is preferably to this end divided into a set of subimages in accordance with a predetermined division scheme and then one such subimage of the first subimage is selected which comprises those image segments which represent mitosing cells of preferably sufficient quality such that subimages of the second image which correspond to the selected subimages of the first image may then be selected.

According to FIG. 1, the subimages are selected in step SC4 such that first subimage data TB11 of selected subimages of the first image and second subimage data TBI2 of selected subimages of the second image which correspond to the subimages of the first image are obtained.

In step SC5, the respective actual presence of the respective antinuclear antibody fluorescence pattern types are then detected by means of a convolutional neural network CNN on the basis of the selected subimages of the first image and of the selected subimages of the second image. The detection result is then output as detection data DI.

Because of the preferential focus on image segments with a mitotic cell of sufficient quality and further because the subimages are selected as a function of those detected image segments which in each case represent at least one mitotic cell of a sufficient quality, it is ensured that the mitosing cell to be taken into consideration or the mitosing cell present in the subimage is in a correct stage in order to constitute, as a valid mitosing cell with regard to the staining of the metaphase plate thereof, valid and reliable information for the detection of the different antinuclear antibody fluorescence pattern types.

FIG. 2 shows essential steps of the convolutional neural network in an embodiment CNN1 for determining detection data DI1 with regard to a presence of antinuclear antibody fluorescence pattern types for a first subimage TB11 and a second subimage TB12. Subimages TB11 and TB12 thus constitute a subimage tuple. Subimages TB11, TB12 are preferably normalized to a range of values or grayscale value range of 0 to 1.

FIG. 14 shows an exemplary first subimage TB11 from the first image B1 and a second subimage TB12 corresponding thereto from the second image B2. It is apparent from FIG. 13 and the associated representation of the second image B2 that the second subimage TB12 is the subimage TBA.

FIG. 14 further shows a segmented subimage TBS for the subimages TB11, TB12 shown here. It is clearly apparent that the regions VMZ represent valid mitosing cells or mitosing cells of sufficient quality.

Such subimages TB11, TB12 are then processed according to FIG. 2 by the convolutional neural network CNN1 in order to determine detection data DI1 and in each case output for N different classes, here by way of example with index n=1–N and N=8, a value which detects or indicates the presence of the pattern as a Boolean value in the range of values $D_n \in \{0,1\}$. The detection data DI1 for all N pattern types or pattern classes with the values DI1-DIN then corresponds to a vector $$\vec{D_1} = \begin{Bmatrix} D_{11} \\ \vdots \\ D_{1N} \end{Bmatrix}.$$

According to FIG. 2, processing then proceeds over a plurality of layers L1-LP of a convolutional neural network CNN1, wherein each layer L1-LP comprises at least one convolutional layer.

The convolutional neural network CNN1 then determines a respective feature map FM1-FMN for each of the N=8 classes or N=8 fluorescence pattern types. On the basis of a respective feature map FM1-FMN, a respective confidence measure P1-PN or a respective prediction value P1-PN is then determined in relation to a respective actual presence of the respective fluorescence pattern types with index n=1–N.

This preferably proceeds by means of a pooling layer PL or a pooling layer function PL, which preferably carries out "global average pooling", reducing a feature map FM1 to an individual scalar value or averaged value, which is preferably also denoted a logit, as a value LO1.

The logit values LO1-LON of the N classes or fluorescence pattern types are then in each case individually subjected to a "sigmoid function" SF in order to determine, on the basis of the respective feature map FMn with index n, a respective prediction value or a respective confidence measure Pn with index n for a respective class n. This structure of the convolutional neural network thus gives rise to the advantage that a dedicated detection channel is present for each individual fluorescence pattern type and that it is possible to detect not only one individual pattern or one individual pattern type as being present but in particular also a plurality of pattern types simultaneously.

Determining respective confidence measures Pn as prediction data or presence data I1 then permits output of prediction values or confidence measures in the form of a vector $$\vec{P_1} = \begin{Bmatrix} P_1 \\ \vdots \\ P_N \end{Bmatrix}$$

with a value range $0 \leq P_n \leq 1$.

It is advantageous for such confidence measures Pn to be determined and preferably also output since, in the event of a subsequent final investigation, a user can make use of a respective confidence measure as an indicator of the presence of a respective pattern.

The part TCNN1 of the convolutional neural network CNN1 which is used for determining the confidence measures Pn on the basis of subimages TB11, TB12 may, as will be explained in detail below, in each case be separately applied to respective subimage tuples TB11, TB12 consisting of a first subimage of the first colour channel TB11 and a second subimage corresponding thereto of the second colour channel TB12.

FIG. 2 further shows more steps by means of which, on the basis of the confidence measures or prediction values, which may be jointly denoted prediction data P1, it is possible to determine detection results or detection values DI1-DIN, which may in turn be jointly denoted detection data DI1.

A confidence measure Pn may then be evaluated by means of a threshold function TS1 with application of a preferably user-predeterminable threshold value or a threshold value T1 predetermined in another manner in order to determine the corresponding detection data DI1. The detection value DI1 may preferably assume the value 1, i.e. indicate the presence of the pattern with the index n=1, if the confidence measure Pn exceeds a threshold value T1 of 0.5. Applying further threshold value operations TS1-TSN using respective threshold values T1-TN which are preferably individual to the respective pattern then enables determination of detection values DI1-DIN.

The convolutional neural network CNN1 from FIG. 2 comprises a partial convolutional neural network TCNN1 which is subsequently also applied in FIG. 3.

FIG. 15 shows exemplary feature maps FM1-FM8 for the different fluorescence pattern types or example patterns which are represented in FIG. 11 and examples of the corresponding fluorescence pattern types from FIG. 24 with the corresponding designations. The feature map FM2 represents an activation with regard to a homogeneous pattern for subimages TB11 and TB12 from FIG. 14. The measure of lightness in feature map FM2 thus indicates a probable presence of a homogeneous fluorescence pattern type in subimage TB12. Feature map FM5 further represents a probable presence of a fine speckled or large/coarse speckled pattern in the corresponding subimage TB12. There is no or only relatively slight activation for the further feature maps FM1, FM3. FM4, FM6, FM7 and FM8. Feature maps FM1-FM8 from FIG. 15 were originally determined with a resolution of 8×8 pixels and then interpolated by means of interpolation to the 512×512 pixel resolution of the second subimage TB12.

FIG. 16a once again shows the second subimage TB12 from FIG. 14 together with feature map FM5 in FIG. 16b and an overlay of this feature map FM5 on subimage TB12 as an overlaid feature map OLM5. It is here clearly apparent that the proposed convolutional neural network has successfully generated a feature map FM5 which highlights or identifies cell nuclei with fine or large/coarse speckling.

FIG. 16c shows feature map FM2 from FIG. 15 for homogeneous patterns and a feature map OLM2 overlaid over subimage TB12 of FIG. 16a. Here too, it is apparent that the proposed convolutional neural network has successfully highlighted or detected those regions from subimage TB12 which represent cell nuclei with homogeneous staining or a homogeneous pattern type.

It is apparent from examining FIG. 14 and the segmented subimage TBS that it is precisely the valid mitosing cells VMZ which are the cells which are detected in the overlaid feature map OLM2 for the detection of the homogeneous pattern according to FIG. 16c. Even if in principle homogeneous staining may be present on the interphase cells which were selected in the overlaid feature map OLM5 from FIG. 16b, such staining is however concealed by the speckled staining of these interphase cells such that a homogeneous pattern cannot reliably be detected in the overlaid feature map OLM5 solely from these interphase cells from FIG. 16b. However, because it has been ensured that the selected subimages TB11 and TB12 from FIG. 14 in any event comprise valid mitosing cells VMZ or the segmented image TBS comprises such valid mitosing cells VMZ, it is thus advantageously possible to identify the homogeneous pattern staining or the homogeneous fluorescence pattern types precisely from these mitosing cells, as is apparent from a joint consideration of the overlaid feature map OLM2 from FIG. 16c and the segmented subimage TBS from FIG. 14.

FIG. 3 illustrates further advantageous configurations of the method according to the invention. The convolutional neural network CNN2 shown here uses the partial convolutional neural network TCNN1 from FIG. 2 in order to determine respective subimage confidence measures PI1-PIJ for respective subimage tuples TB11, TB12-TBJ1, TBJ2 with tuple index j=1–J, as previously shown and described in detail in FIG. 2, in order then to determine the respective actual presence of the respective fluorescence pattern types and the associated respective confidence measures on the basis of the subimage confidence measures as presence data or prediction data PI. A subimage confidence measure PI here corresponds to a vector $\vec{P}_j$ with index j. The data PI here corresponds to a vector $$\vec{P} = \left\{ \begin{array}{c} \overline{P}_1 \\ \vdots \\ \overline{P}_N \end{array} \right\}$$

with a respective confidence measure $\overline{P}_n$ for a respective fluorescence pattern type with index n.

The resultant subimage confidence measures $\vec{P}_j$ with index j=1–J are then, in an averaging step MS, averaged over all the selected j=1–J subimages or subimage tuples according to $$\vec{P} = \frac{1}{J} \sum_{i=1}^{J} \vec{P}_i.$$

These confidence measures $$\vec{P} = \left\{ \begin{array}{c} \overline{P}_1 \\ \vdots \\ \overline{P}_N \end{array} \right\}$$

may then be output as the prediction data or confidence data PI.

This configuration of the method according to the invention is advantageous because a convolutional neural network CNN2 thus need not simultaneously process all the data at once from an entire first and entire second image B1, B2 from FIGS. 9 and 10, but may instead in each case individually evaluate the subimage tuples in separate, mutually distinct processing pathways.

The determined confidence measures PI or $$\vec{P} = \left\{ \begin{array}{c} \overline{P}_1 \\ \vdots \\ \overline{P}_N \end{array} \right\}$$

may then be evaluated in respective threshold value assessment steps TS1-TSN using threshold values T1-TN which are preferably predeterminable or indeed predetermined in another manner in order to output corresponding detection data DI with corresponding detection values D1-DN with index n=1–N as $$\vec{D_1} = \left\{ \begin{array}{c} D_1 \\ \vdots \\ D_N \end{array} \right\}$$

FIG. 5 shows details of step SC3 from FIG. 1 for detecting, on the basis of the first image BI1, image segments which in each case represent at least one mitotic cell of preferably sufficient quality. This proceeds by means of a segmentation convolutional neural network SEG-CNN. The segmentation convolutional neural network SEG-CNN comprises steps or layers LA1-LAQ which may in turn be regarded as a convolutional neural network. Segmentation thus proceeds by means of a further convolutional neural network SEG-CNN which differs from the convolutional neural network CNN2 for detecting, on the basis of the selected subimages of the first image and of the selected subimages of the second image, respective actual presence of respective cellular fluorescence pattern types by means of a convolutional neural network. Dividing the segmentation task and detection task between two different convolutional neural networks is advantageous since the convolutional neural network for detection need not also be trained for the purposes of segmentation and thus the convolutional neural network can be trained particularly specifically for segmentation purposes.

According to FIG. 5, the first image, for example image B1 from FIG. 9, or the corresponding image data BI1, is supplied to a convolutional neural network CNNS for segmentation purposes.

FIG. 5 shows the segmentation convolutional neural network SEG-CNN which, by means of a plurality of layers LA1, LAQ, brings about segmentation of an input image. The image data BI1 is preferably normalized to a range of values from 0 to 1. "Downscaling" is preferably further performed in an optional step DWS. A first image of the image data B1 preferably has a dimensionality of 2400× 1700 pixels. This first image may then be reduced to a size of 800×800 pixels by "downsampling". The further processing steps are here described in detail for the exemplary case in which the first image is downscaled DWS to a size of 800×800 pixels. This is, however, not absolutely necessary and the segmentation convolutional neural network SEG-CNN may also be dimensioned such that it is capable of processing the first image with a size of 2400×1700 pixels without downscaling.

The convolutional neural network CNNS comprises a plurality of layers LA1-LAQ, wherein each of these layers comprises at least one convolutional layer.

The convolutional neural network CNNS then generates for each of the segment classes s=1-S with here for example S=6 classes, as indicated by the key in FIG. 12b, a respective activation map M1-MS. The activation maps M1-MS in each case preferably have the same size or resolution of preferably 800×800 pixels as the first image or the first image data BI1 after downscaling DWS.

The activation map M1 for the first segment class s=1 indicates in its first pixel PI1 with the value present there, the degree to which the pixel corresponding thereto of the first image B1 or of the image data BI1 belongs to this first segment class. Corresponding individual pixels PI1-PIS of activation maps M1-MS in each case indicate the degree to which the pixel located at the same point in the first image B1 or the first image data BI1 belongs to the corresponding class. By linking the values of the activation maps M1, M2-MS to the same pixel location or the matching values of this corresponding pixel location PI1. P2-PIS by means of a "softmax function" SMX, it is then possible to produce a probability map PM1 in order to generate for a corresponding pixel position PIX1 a value which indicates the probability for which, within a range of values from 0 to 1, the corresponding pixel of the first image B1 belongs to the first class with s=1. This may be correspondingly determined for the further S classes with s=1–S by means of an in each case separately applied softmax function SMX for corresponding pixels and corresponding probability maps PMs plotted for the s=1–S segment classes. The x and y axes shown here indicate respective indices for the corresponding pixel positions within the probability maps PM1-PMS. The probability maps PM1-PMS preferably have the same size or resolution of preferably 800×800 pixels as the first image or the first image data BI1 after downscaling DWS and as the activation maps M1-MS.

A segmentation map SM is then determined which, at a corresponding pixel position PIX1, has a value from the range of values s∈{1, . . . , S} and indicates the segment class s=1–S to which the corresponding pixel of this position PIX1 belongs. To this end, the corresponding pixel values of the corresponding pixel position PIX1 are here linked across all the probability maps PM1-PMS by means of an argmax function. A pixel of the segmentation map SM with the index x, y thus then contains that index value of that probability map PM1-PMS for which the corresponding probability value was the highest at the pixel position. This may be determined according to $$SM(x, y) = \underset{s \in \{1 \ldots S\}}{\mathrm{argmax}} PM_s(x, y).$$

The segmentation map SM thus then contains for each individual pixel a value from the range of values s=1–S which assigns a respective segment class to the corresponding pixel.

The segmentation map SM is preferably of the same size or resolution of preferably 800×800 pixels as the first image or the first image data BI1 after downscaling DWS, as likewise are the activation maps M1-MS and likewise the probability maps PM1-PMS.

If, prior to segmentation, the first image B1 or first image data BI has been downscaled in an optional step DWS, then in a step UP, which is preferably to be performed, the segmentation map SM may preferably be upscaled from preferably 800×800 pixels back to the original image resolution of the image B1, for example 2400×1700 pixels.

In order to merge subareas or segment areas, the segmentation map SM may then be further processed by means of digital image processing in an image processing step BV by conventional image processing measures such as erosion, dilation and/or contour matching in order then to obtain a modified segmentation map SM' which can be output as segmentation data SI. FIG. 12a shows such data with segmentation SI.

FIG. 5 illustrates the manner in which the first image can be segmented into image segments of different segment classes, wherein the segment classes may be selected as illustrated in FIG. 12b. At least one first segment class preferably represents a cell stage of a cell and at least one second segment classes further represents a cell region within a cell.

The segmentation data SI, as shown by way of example as the segmentation image SB in FIG. 12a, may then be used, on the basis of one or more image segments of at least one specific segment class, to determine at least one lightness value for at least one fluorescence pattern type and then to verify at least one confidence measure of a fluorescence pattern type on the basis of at least one such lightness value.

FIG. 5 shows in this connection the possibility of extracting, on the basis of the second image B2 and on the basis of the segment data SI, at least one lightness value for at least one fluorescence pattern type from the second image B2. This proceeds in a lightness determination step SH.

According to FIG. 5, a lightness value for at least one fluorescence pattern type is thus determined on the basis of one or more image segments of at least one specific segment class and the confidence measure of the fluorescence pattern type is verified on the basis of the lightness value of the fluorescence pattern type.

Corresponding lightness values $h_n$ with index n=1–N may then be determined as a vector $$\vec{h} = \begin{Bmatrix} h_1 \\ \vdots \\ h_N \end{Bmatrix}$$

for the different n=1–N classes and output as lightness data HI.

If, for example, the process is directed towards a lightness value for a "dense fine speckled" pattern (AC-2) of pattern type n=4, a lightness value may be determined by making reference to the interphase cells of segment class s=4, which are also shown in FIG. 12a, with their lightness values at the matching corresponding points of image B2 from FIG. 10. The 0.65 quantile of the lightness value may then for example be determined individually for each interphase cell or each segment area with index s=4 and then the resultant plurality of quantile lightness values of the plurality of interphase cells may be averaged once again by means of averaging in order to determine a lightness value $h_4$ for the fluorescence pattern with index n=4.

In the case of a "fine or large/coarse speckled" pattern of type AC-4, AC-5 with index n=5, the process may then for example be directed towards a 0.65 quantile of the lightness values of an interphase cell or a corresponding segment area of class s=4 and then be averaged over these lightness values to determine a lightness value $h_S$ for the fluorescence pattern with index n=5.

In the case of "homogeneous" patterns (AC-1) of the type with index n=2, as also illustrated in FIG. 11 on the basis of example pattern BM2, a 0.5 quantile may then for example firstly be determined for each valid mitosing cell or each corresponding segment area of class s=6 and then averaged over the quantile values for all valid mitosing cells in order to determine a lightness value $h_2$ for the fluorescence pattern with index n=2.

Lightness values determined in this manner $$\vec{h} = \begin{Bmatrix} h_1 \\ \vdots \\ h_N \end{Bmatrix}$$

may then be provided as lightness data HI.

FIG. 4 illustrates in this connection an exemplary procedure in which a vector $$\vec{P} = \begin{Bmatrix} \overline{P}_1 \\ \vdots \\ \overline{P}_N \end{Bmatrix}$$

with corresponding confidence measures for the corresponding n=1–n class is determined on the basis of the first image B1 and of the second image B2 by means of a partial convolutional neural network TCNN2, which is indicated in FIG. 3.

This is then provided as confidence measure data or prediction data PI.

For this purpose, the partial convolutional neural network TCNN2 makes use of those subimages or those subimage data TB11, TBI2 which have been determined by means of segmentation step SC3 and the segmentation data SI obtained therefrom, on the basis of the first image B1 as well as the second image B2. The input for the partial convolutional neural network TCNN2 is thus those subimages which have been selected from the first image B1 and the second image B2 by segmentation step SC3 and selection step SC4.

The segmentation data SI is then put to use in step SH for determining the lightness values, which have already been described in FIG. 5, in order, on the basis of the lightness values of the second image B2, to determine and provide the lightness data H which may also be described as the vector $$\vec{h} = \begin{Bmatrix} h_1 \\ \vdots \\ h_N \end{Bmatrix}$$

In a checking step PS, the confidence measure data PI is then verified on the basis of the lightness data HI.

The values of the confidence measure $$\vec{P} = \begin{Bmatrix} \overline{P}_1 \\ \vdots \\ \overline{P}_N \end{Bmatrix}$$

are then verified on the basis of one or a plurality of threshold values in relation to the confidence measure values in the form of threshold values T1-TN as well as preferably on the basis of lightness threshold values in H1-HN which are applied to the lightness values $$\vec{h} = \begin{Bmatrix} h_1 \\ \vdots \\ h_N \end{Bmatrix}$$

This thus makes it possible to output verified confidence measures PI*. The threshold values T1-TN are predetermined. The threshold values H1-HN are predetermined. The threshold values T1-TN may preferably be predetermined by a user in order to exert an influence on the evaluation. The threshold values H1-HN may preferably be predetermined by a user in order to exert an influence on the evaluation. The threshold values H1-HN are individual threshold values per fluorescence pattern type. The verified confidence measures PI* as a vector $$\vec{P^*} = \begin{Bmatrix} \overline{P^*}_1 \\ \vdots \\ \overline{P^*}_N \end{Bmatrix}$$

are then preferably determined according to $$\overline{P^*}_n = \begin{cases} 1 \text{ for } \overline{P}_n > T_n \cap h_n > HS_n \\ 0 \text{ else} \end{cases}.$$

The procedure proposed here is advantageous since, while the confidence measures are indeed initially determined on the basis of the first image and of the second image or of the corresponding subimages in which a convolutional neural network determines the confidence measures PI, lightness values HI from the second image or the entire second image are now also explicitly determined, in particular without any reduction to subimages, in order to verify the confidence measure or confidence measures PI. This enables still more accurate detection of fluorescence pattern types. One advantage is here in particular that the entire second image B2 is taken into consideration with regard to lightness values in corresponding segment classes, such that it is not only a lightness of cells or segment areas of an individual subimage which are taken into consideration but also segment areas outside selected subimages. This means that any possible lightness artefact on an individual cell or an individual segment area of a subimage has a less severe impact on the determination of the lightness values and thus on the determination of the verified confidence measures because lightness values from segment areas outside the subimage are also applied to confidence measures of a subimage and a lightness artefact of an individual segment area is less strongly weighted in order to determine the verified confidence measures.

FIG. 2 shows pre-processing steps VS, VS1, VS2 which may be used for pre-processing the first subimage TB11 and the second subimage TB12. The first pre-processing step VS1 involves folding the first subimage TB11 and the second subimage TB12 as input feature maps with preferably eight different folding kernels, wherein no striding is performed and wherein the dimensionality of subimages TB11, TB12 with an exemplary dimensionality of 512×512 image pixels is retained. The selected number of eight folding kernels need not necessarily correspond to the number of N=8 fluorescence pattern types or fluorescence pattern classes.

The further pre-processing step VS2 then involves "batch normalization", wherein the number of feature maps, here for example eight feature maps, is retained.

The eight feature maps obtained from step VS2 are then processed in a succession of P different layers L1-LP with index p=1–P and here by way of example P=6. At the end of layer L1, a set of for example R feature maps FMA1-FMAR with index r=1–R is obtained. In this example, the parameter is preferably R=11. The number R of the feature maps at the end of the first layer L1 may deviate from the number of fluorescence pattern types N.

In detail, the P layers L1-LP follow one another, wherein FIG. 25 shows an exemplary structure of the first layer L1.

After the final layer LP, 56 feature maps of 8×8 pixel dimensionality are for example obtained. A concluding processing step AVS then involves folding with N folding kernels corresponding to the number of N classes or N fluorescence pattern types in order to generate the N different feature maps FM1-FMN.

FIG. 25 shows in this connection an exemplary embodiment of the first layer L1 from FIG. 2. Pre-processing step VS2 is here shown between dashed lines because it is not part of this layer L1 but instead only upstream thereof.

The feature maps from pre-processing step VS2 are in each case forwarded to processing steps PS1, PS2, PS4. Each of these processing steps PS1, PS2, PS4 individually processes all of the feature maps received from step VS2.

A step PS1 involves folding with 8 kernels without striding. A step PS2 involves folding with 8 kernels with a striding factor of 2. Step PS4 involves folding with 11 kernels with a striding factor of 2.

A step PS3 involves "max pooling" for each of the feature maps with a striding factor of a value of 2.

A step PS5 involves concatenating the 8 feature maps from step PS3 with the 8 feature maps from step PS2. A step PS6 in turn involves folding the 16 incoming feature maps with 11 kernels without striding.

A step PS7 involves "batch normalization" on each of the 11 feature maps.

A step PS8 involves "activation", preferably in the form of ReLU activation.

A step PS9 preferably involves a "dropout" during the training phase with a dropout factor of 20%. This dropout does not proceed during the classification phase.

A step PS10 involves folding with 11 kernels without striding.

The results of the feature maps or the 11 feature maps from step PS10 are summed element by element in step PS11 with the 11 feature maps from step PS4 such that step PS11 in turn generates 11 feature maps. No striding is performed here.

A step PS12 involves another "batch normalization".

A step PS13 involves "activation", preferably in the form of ReLU activation.

A step PS14 then preferably involves a dropout during the training phase with a dropout factor of for example 20%.

Returning to FIG. 2, it may be noted that preferably P=6 such layers follow one another which are dimensioned such that the final layer LP with P=6 then generates feature maps which have a size of 8×8 pixels. The final layer LP 56 (fifty six) preferably generates various such feature maps, wherein a post-processing step AVS shown in FIG. 2 involves folding the 56 feature maps with N=8 kernels in order to generate the N=8 feature maps FM-FMN.

FIG. 5 shows the segmentation convolutional neural network SEG-CNN which, by means of layers LA1. LAQ, segments the first image B1 or image data BI1. "Downscaling" preferably proceeds in an optional step DWS. The first image in the form of the image data BI1 preferably has a dimensionality of 2400×1700 pixels. This first image may then be reduced to a size of 800×800 pixels by "downsampling". The further processing steps from FIG. 26 are here described in detail for the exemplary case in which the first image is downscaled DWS to a size of 800×800 pixels. This is, however, not absolutely necessarily and the convolutional neural network CNNS from FIG. 26 may also be dimensioned such that it is capable of processing the first image with a size of 2400×1700 pixels without downscaling.

FIG. 26 illustrates details of the convolutional neural network CNNS from FIG. 5. In FIG. 26, a first step PS21 involves folding with 32 kernels which, on the basis of the parameter 32, can be read out at the output layer.

Because the input size of step PS21 has a dimensionality of 800×800 pixels and the output size of step PS21 also has a dimensionality of 800×800 pixels, it may be concluded that no striding occurs. The dimensionality of the input size is stated as "input" between parentheses by means of the two numbers following the indication "None" for each of processing steps PS21-P37. The dimensionality of the output size is further stated as "output" between parentheses by means of the two numbers following the indication "None" for each of processing steps PS21-P37.

The various steps PS21 to PS37 bring about processing of the first image or image data BI1 to yield the feature maps M1-MS, as already illustrated in FIG. 5.

It should here be noted that step PS29 carries out "deconvolution" or transposed convolution.

The further steps either perform folding, as already described in the course of the description of FIG. 25, or indeed max pooling or concatenation, as also already described in the course of the description relating to FIG. 25.

If, prior to processing of the image data BI1, which is also illustrated in FIG. 5, the first image or image data BI1 are downsampled, corresponding upsampling may also proceed once the segmentation map SM has been determined before the segmentation map SM is supplied to the further image processing step BV.

FIG. 17a shows an image BX as a fluorescence image of a second colour channel or in relation to a second fluorescent dye for a mixed pattern in which not only a nucleolar pattern (AC-8, 9, 10) of class n=7 is present but also a fine or large/coarse speckling as the fluorescence pattern type of class n=5 (AC-4, AC-5).

FIG. 17b shows by way of example in this connection a magnified view of an interphase cell IZX together with a mitosing cell MZX. It is clearly apparent that the metaphase plate of the mitosing cell MZX is not significantly stained or the mitosing cell with its chromosomes of the metaphase plate is not stained. This information makes it possible to differentiate whether a fine or large/coarse speckled pattern (AC-4, AC-5) is present here or indeed whether it is perhaps instead a homogeneous pattern (AC-1). Since the mitosing cell MZX with its metaphase plate is not stained there in the chromosome region, homogeneous staining of class n=2 can be ruled out because, if the staining were homogeneous, the mitosing cell would also have to be homogeneously stained in the region of the metaphase plate but this is not the case here. Therefore, including the mitosing cell in the fluorescence pattern type detection means it is reliably possible to detect that a homogeneous fluorescence pattern type is not involved but instead a fine speckled fluorescence pattern type with n=5 (AC-4) or indeed a large/coarse speckled fluorescence pattern type with n=5 (AC-5).

FIG. 18 shows a further example BY of an image in the second fluorescence channel or in relation to the second fluorescent dye with both a mitosing cell MZY and an interphase cell IZY being highlighted.

FIG. 19a shows in this connection a magnified representation of this interphase cell IZY and FIG. 19b shows the corresponding mitosing cell MZY with its metaphase plate MP.

Image BY from FIG. 18 is an image in which three fluorescence pattern types are present. This fluorescence pattern image includes fluorescence pattern type n=7, also denoted nucleolar (AC-8, 9, 10), together with fluorescence pattern type n=6, also denoted discrete nuclear dots (AC-6, 7), as well as fluorescence pattern type n=5, also denoted fine speckled (AC-4) as one of the variants of fluorescence pattern type n=5 (AC-4, AC-5). FIG. 19a indicates in this connection staining of the nucleolar pattern by the regions NU, staining of the nucleolar dots pattern by the regions DO and also staining by the fine speckled pattern by the further region FG of the cell nucleus.

It is in particular advantageous here that, according to the method of the invention, the mitosing cell MZY must also be present in a subimage, since the metaphase plate MP is not stained or its chromosomes are not stained, such that here the region of fine speckling FG may be reliably detected as fine speckled (AC-4) with n=5 and not erroneously identified as homogeneously stained, as might be the case with the homogeneous pattern n=2 (AC-1) since in the case of this homogeneous pattern the metaphase plate MP would have to be significantly stained. Pattern staining of the "dense fine speckled" type with n=4 (AC-2) may also be ruled out because in this fluorescence pattern type the metaphase plate MP of the mitosing cell MZY would have to be significantly stained.

This once again shows that the method according to the invention, in which subimages are selected as a function of whether they comprise image segments with at least one mitotic cell of preferably sufficient quality, enables particularly high quality detection of different fluorescence pattern types.

FIG. 20 shows a further exemplary fluorescence image BZ in which a subimage region TBZ12 comprises a mitosing cell MZZ. This fluorescence image of the second colour channel or in relation to the second fluorescent dye unambiguously reveals a "dense fine speckled" pattern of type n=4 (AC-2).

FIG. 21 shows in this connection the exemplary subimage TBZ11 as the first subimage of the first fluorescent dye and the second subimage TBZ12, which corresponds to the first subimage TBZ11, from the second fluorescence colour channel. FIG. 21 further shows the related segmented subimage TBZS.

FIG. 22 shows feature maps FM1-FM8 corresponding thereto for the various fluorescence pattern types or fluorescence pattern classes n=1-8 in relation to subimages TBZ11, TBZ12 from FIG. 21.

The activation in feature map FM4 of corresponding class n=4 is clearly apparent for the dense fine speckled pattern as fluorescence pattern type (AC-2) which clearly predominates here.

In this connection, FIG. 23a once again shows the second subimage TBZ12 which comprises the mitosing cell MZZ shown magnified in FIG. 23c. FIG. 23b shows feature map FM4 of the corresponding fluorescence pattern type n=4 and an overlay of this feature map FM4 over the second subimage TBZ12 as the overlaid image OLM4. It is clearly apparent that feature map FM4 focuses on those image areas of the second subimage TBZ12 which comprise the interphase cells stained in accordance with the fluorescence pattern type and also the mitosing cell stained in accordance with the fluorescence pattern type.

FIG. 23c further once again shows a magnified representation of the mitosing cell MZZ which is present in subimage TBZ12. The unambiguous staining of the metaphase plate of the mitosing cell MZZ here enables detection of dense fine speckled fluorescence pattern type n=4.

The method according to the invention has here been described on the basis of the first and second image being acquired in a step SC2 from FIG. 1. A method for detecting respective potential presence of respective different cellular fluorescence pattern types on a biological cell substrate comprising human epithelioma cells by means of digital image processing is therefore also proposed which begins with the step of acquiring the first image and the second image.

As an alternative to step SC2 of acquiring the first and the second image, a method for digital image processing may also be carried out accordingly and in a similar manner in which, in a corresponding step, such a first image and such a second image are provided or received and in which further steps SC3, SC4, SC5 are then carried out.

In this connection, FIG. 7a shows a proposed computing unit R which receives not only a corresponding first image or first image data BI1 but also a corresponding second image or corresponding second image data B12 in the form preferably of a data signal SIG via an interface DS2. The computing unit R may then output, preferably via an output interface AS, in particular to a display unit AE, the determined confidence measures PI, the verified confidence measures PI* and/or the detection data DI.

This information may preferably also be output via a data interface DS3 in the form of a data network interface in the form of a signal SI3.

FIG. 7b shows in this connection a proposed data network apparatus which, via an interface S4 and a corresponding data signal SIG1, receives the images or image data BI1, B2. The data network apparatus further preferably comprises an internal data bus IDB which connects a previously described computing unit R preferably with a memory unit MEM.

FIG. 7c illustrates a proposed computer program product CPP which comprises commands which, on execution of the program by a computer, causes the latter to carry out the proposed method for digital image processing. This computer program product may for example be provided or transferred in proposed manner via a data signal SIG2. This transfer may proceed to a computer CO or to a data interface DSX of the computer CO.

FIG. 6 illustrates an exemplary embodiment of the apparatus according to the invention V1. The apparatus V1 comprises a holder HL for the substrate SU. Excitation light AL from an excitation light source LQ is prefiltered by an optical filter F1 and then guided by means of a dichroic mirror SP1 by an optical system O to the substrate. Any fluorescence radiation or fluorescent light FL which arises then passes back from the substrate SU through the lens O through the dichroic mirror SP1 and through an optical filter F2. The optical filter F2 filters out one wavelength of the excitation radiation or of the excitation light AL. The fluorescent light FL is then supplied to at least one image acquisition unit in the form of a camera K1 and preferably a further camera K2. The fluorescent light FL is split by a dichroic mirror SP2. Fluorescent light FR1 of a first colour channel, preferably a red colour channel, is filtered out by an optical FR and supplied to the image acquisition unit K1. The image acquisition unit K1 acquires a first fluorescence image of the substrate SU in the first colour channel. Fluorescence radiation FL2 of the second colour channel, preferably the green colour channel, is filtered out by an optical filter FG and supplied to the image acquisition unit K2 which acquires a second fluorescence image of the substrate SU in the second colour channel.

A computing unit R is configured to receive the first fluorescence image in the form of digital image data BI1. The computing unit R is further configured to receive the second fluorescence image in the form of digital image data BI2. The computing unit R is further configured to detect, on the basis of the first image, respective image segments which in each case represent at least one mitotic cell, further to select, on the basis of the detected image segments, subimages of the first image and subimages corresponding thereto of the second image and further to detect, on the basis of the selected subimages of the first image and of the selected subimages of the second image, respective actual presence of respective cellular fluorescence pattern types by means of a convolutional neural network.

The apparatus V1 can provide, via a data interface DS1, a detection result in the form of detection data DI and/or presence data or prediction data PI, PI*.

Although many aspects have been described in connection with an apparatus, it will be understood that these aspects also constitute a description of the corresponding method such that a block or component of an apparatus should also be understood as a corresponding method step or as a feature of a method step. Similarly, aspects which have been described in connection with or as a method step also constitute a description of a corresponding block or detail or feature of a corresponding apparatus.

Depending on specific implementation requirements, exemplary embodiments of the invention may implement the computing unit R or the data network apparatus DV in hardware and/or in software. A computing unit R stated here may here be implemented as at least one computing unit or indeed by a plurality of interconnected computing units. Implementation may proceed using a digital storage medium, for example a floppy disc, a DVD, a Blu-Ray disc, a CD, a ROM, a PROM, an EPROM, an EEPROM or a flash memory device, a hard disc or another magnetic or optical storage device on which electronically readable control signals are stored which interact or are capable of interacting with a programmable hardware component in such a way that the respective method is carried out.

A programmable hardware component may be formed as a computing unit by a processor, a central processing unit (CPU), a computer, a computer system, an application-specific integrated circuit (ASIC), an integrated circuit (IC), a system on chip (SoC), a programmable logic element or a field programmable gate array (FGPA) with a microprocessor.

The digital storage medium may therefore be machine- or computer-readable. Many exemplary embodiments thus comprise a data storage medium which comprises electronically readable control signals which are capable of interacting with a programmable computer system or a programmable hardware component in such a manner that a method described herein is carried out.

Exemplary embodiments or parts of the exemplary embodiments of the present invention may in general be implemented as programs, firmware, computer programs or computer program products with program code or as data, wherein the program code or data is effective in carrying out one of the methods or part of a method when the program is run on a processor or a programmable hardware component.

A person skilled in the art may refer to an open-source deep-learning library by the name of "Keras" for the implementation of one or more exemplary embodiments of the convolutional neural networks proposed here. A person skilled in the art will find more detailed information at keras.io.

Example

The stated system or the method according to the invention was tested on 161 different patient samples with the test samples being diluted in a linear dilution series starting from 1:40. In other words, the patient samples were diluted in a linearly increasing series starting from 1:40 and incubated. In this case, test samples were diluted either in the steps 1:40, 1:80, 1:640, 1:1280 or 1:40, 1:80, 1:160, 1:320, 1:640, 1:1280, 1:2560, 1:5120, 1:10240. The system is, however, not in any way limited to predetermined dilution series.

A pattern was stated by an expert to be present in relation to a specific sample if, at any dilution or in any fluorescence image, it was identified as being present in relation to the specific sample. The pattern did not need to be identified by the expert at all dilutions or in all fluorescence images in relation to the specific sample in order to be declared present.

A pattern was stated by an expert to be negative (comprising no pattern) in relation to a specific sample if it was identified as negative (comprising no pattern) in relation to the specific sample at all dilutions or in all fluorescence images.

A pattern was detected by the method according to the invention as generally present in relation to a specific sample if, at any dilution or in any fluorescence image, it was detected as being present in relation to the specific sample. The pattern did not need to be detected by the method according to the invention at all dilutions or in all fluorescence images in relation to the specific sample in order to be detected as generally present.

A pattern was detected as negative (comprising no pattern) by the method according to the invention in relation to a specific sample if it was detected as negative (comprising no pattern) in relation to the specific sample at all dilutions or in all fluorescence images.

In the event of for example two different actually present patterns being present, both patterns were also stated by an expert as both being present if he/she identified both patterns at different dilutions or in different fluorescence images of a single sample.

In the event of for example two different actually present patterns being present, both patterns were also detected as both being present by the method according to the invention if the method detected both patterns at different dilutions or in different fluorescence images of a single sample.

If, for example, the homogeneous pattern was detected at the 1:40 dilution and another pattern at another dilution, for example 1:80, both patterns are output for this sample.

The identification rates set out in Table 1 in FIG. 27 relate to a complete patient sample at all dilutions. Table 1 indicates the following parameters in each case for various patterns as well as for the case of a negative sample:

TA: "True Acceptance", this is the number of samples in which, at any dilution, an expert has decided that this pattern is present and in which the system has decided that this pattern is present at at least one dilution.

FA: "False Acceptance", this is the number of samples in which, at all dilutions, an expert has decided that this pattern is not present and in which the system has decided that this pattern is present at at least one dilution.

TR: "True Rejection", this is the number of samples in which, at all dilutions, an expert has decided that this pattern is not present and in which the system has decided that this pattern is not present at all dilutions.

FR: "False Rejection", this is the number of samples in which, at any dilution, an expert has decided that this pattern is present and in which the system has decided that this pattern is not present at all dilutions.

Sens: system sensitivity as an absolute number.
FAR: "False Acceptance Rate" as an absolute number.
Spec: specificity as an absolute number.
FRR: "False Rejection Rate" as an absolute number.

The results were obtained by application of the complete system, namely segmentation network, classification network, application of threshold values of the probabilities of the individual patterns and application of the threshold values of the lightness values of the individual patterns.

The convolutional neural network for the identification of a presence of the pattern used a total of 5949 subimage tuples for training, of which 25% of the respective pattern types were used for a separate validation. A total of 6463 images, 4847 in the actual training set and 1616 in a validation set, were available to the convolutional neural network for segmentation.

The invention claimed is:

1. A method for detecting respective potential presence of respective different cellular fluorescence pattern types on a biological cell substrate comprising human epithelioma cells,
    wherein the cellular fluorescence pattern types comprise a plurality of different antinuclear antibody fluorescence pattern types,
    wherein the method comprises
        incubating the biological cell substrate with a liquid patient sample, which potentially comprises primary antibodies,
        a first fluorescent dye, and
        secondary antibodies, which are labelled with a second fluorescent dye,
    acquiring a first image which represents staining of the biological cell substrate by the first fluorescent dye and acquiring a second image which represents staining of the biological cell substrate by the second fluorescent dye,
    detecting, on the basis of the first image, respective image segments which in each case represent at least one mitotic cell,
    selecting, on the basis of the detected image segments, only subimages of the first image and subimages corresponding thereto of the second image, the subimages corresponding thereto of the second image having pixel coordinates identical to those of the subimages of the first image, and wherein selection of the subimages corresponding thereto of the second image is based on the pixel coordinates, and
    detecting, on the basis of the subimages of the first image and of the subimages of the second image, respective actual presence of respective cellular fluorescence pattern types by a convolutional neural network.

2. The method according to claim 1, further comprising:
    detecting, on the basis of the first image, respective image segments which in each case represents at least one mitotic cell of a sufficient quality,
    selecting subimages of the first image and subimages corresponding thereto of the second image on the basis of the respective image segments which in each case represents at least one mitotic cell of a sufficient quality.

3. The method according to claim 1, further comprising:
    determining, on the basis of the selected subimages of the first image and of the selected subimages of the second image, respective confidence measures for the respective actual presence of the respective cellular fluorescence pattern types by the convolutional neural network.

4. The method according to claim 3, wherein the convolutional neural network comprises:
    an output layer which generates a respective feature map for the respective cellular fluorescence pattern type, and
    wherein the convolutional neural network determines the respective confidence measure on the basis of the respective feature map.

5. The method according to claim 3, further comprising:
    segmenting the first image into image segments of different segment classes,
    determining at least one lightness value for at least one cellular fluorescence pattern type on the basis of one or more image segments of at least one specific segment class, and
    verifying the confidence measure of the at least one cellular fluorescence pattern type on the basis of the at least one lightness value of the at least one cellular fluorescence pattern type.

6. The method according to claim 5, wherein the confidence measure is verified on the basis of the at least one lightness value and as a function of a user-predeterminable threshold value.

7. The method according to claim 3, further comprising:
    for a respective subimage tuple which comprises the subimage of the first image and the subimage of the second image, determining respective subimage confidence measures for respective actual subimage presence of respective cellular fluorescence pattern types by the convolutional neural network, and determining the respective confidence measures for the respective actual presence of the respective cellular fluorescence pattern types on the basis of the respective subimage confidence measures.

8. An apparatus for detecting respective potential presence of respective different cellular fluorescence pattern types on a biological cell substrate comprising human epithelioma cells by digital image processing, the apparatus comprising:

a holder for the biological cell substrate, which has been incubated with a liquid patient sample and comprises, primary antibodies,
a first fluorescent dye, and
secondary antibodies which are labelled with a second fluorescent dye, at least one image acquisition unit for acquiring a first image which represents staining of the biological cell substrate by the first fluorescent dye and for acquiring a second image which represents staining of the biological cell substrate by the second fluorescent dye, and at least one computing unit, which is configured
to detect, on the basis of the first image, respective image segments which in each case represents at least one mitotic cell,
to select, on the basis of the respective image segments, only subimages of the first image and subimages corresponding thereto of the second image, the subimages corresponding thereto of the second image having pixel coordinates identical to those of the subimages of the first image, and wherein selection of the subimages corresponding thereto of the second image is based on the pixel coordinates, and
to detect, on the basis of the subimages of the first image and of the subimages of the second image, respective actual presence of respective cellular fluorescence pattern types by a convolutional neural network.

9. A method for detecting respective potential presence of respective different cellular fluorescence pattern types on a biological cell substrate comprising human epithelioma cells by digital image processing, the method comprising:

acquiring a first image which represents staining of a biological cell substrate by a first fluorescent dye,
acquiring a second image which represents staining of the biological cell substrate by a second fluorescent dye,
detecting, on the basis of the first image, respective image segments which in each case represent at least one mitotic cell,
selecting, on the basis of the respective image segments, only subimages of the first image and subimages corresponding thereto of the second image, the subimages corresponding thereto of the second image having pixel coordinates identical to those of the subimages of the first image, and wherein selection of the subimages corresponding thereto of the second image is based on the pixel coordinates, and
detecting, on the basis of the subimages of the first image and of the subimages of the second image, respective actual presence of respective cellular fluorescence pattern types by a convolutional neural network.

10. A method for digital image processing, comprising:
receiving a first image which represents staining of a biological cell substrate by a first fluorescent dye, wherein the biological cell substrate comprises human epithelioma cells,
receiving a second image which represents staining of the biological cell substrate by a second fluorescent dye,
detecting, on the basis of the first image, respective image segments which in each case represents at least one mitotic cell,
selecting, on the basis of the detected image segments, only subimages of the first image and subimages corresponding thereto of the second image, the subimages corresponding thereto of the second image having pixel coordinates identical to those of the subimages of the first image, and wherein selection of the subimages corresponding thereto of the second image is based on the pixel coordinates, and
detecting, on the basis of the subimages of the first image and of the subimages of the second image, respective actual presence of respective cellular fluorescence pattern types by a convolutional neural network.

11. A computing unit which, in a course of digital image processing, is configured to:
receive a first image, which represents staining of a biological cell substrate by a first fluorescent dye, wherein the biological cell substrate comprises human epithelioma cells,
receive a second image, which represents staining of the biological cell substrate by a second fluorescent dye,
detect, on the basis of the first image, respective image segments which in each case represents at least one mitotic cell,
select, on the basis of the respective image segments, only subimages of the first image and subimages corresponding thereto of the second image, the subimages corresponding thereto of the second image having pixel coordinates identical to those of the subimages of the first image, and wherein selection of the subimages corresponding thereto of the second image is based on the pixel coordinates, and
detect, on the basis of the subimages of the first image and of the subimages of the second image, respective actual presence of respective cellular fluorescence pattern types by a convolutional neural network.

12. A data network apparatus, comprising:
at least one data interface for receiving the first image which represents staining of the biological cell substrate by the first fluorescent dye, wherein the biological cell substrate comprises human epithelioma cells, and for receiving the second image which represents staining of the biological cell substrate by the second fluorescent dye, and
the computing unit according to claim 11.

13. A non-transitory machine-readable medium having stored thereon machine-readable instructions executable to cause a machine to perform operations comprising the method for digital image processing according to claim 10.

14. The method according to claim 1, wherein selected subimages of the first image and subimages corresponding thereto of the second image each contain the at least one mitotic cell.

15. The method according to claim 1, wherein the first image and the second image have identical spatial orientation.

* * * * *